US012678738B2

(12) United States Patent
Tutic et al.

(10) Patent No.:  US 12,678,738 B2
(45) Date of Patent:      Jul. 14, 2026

(54) WAVE-ACTUATED SYSTEM, WAVE ENERGY CONVERTER SUBSYSTEM, AND METHOD FOR OPERATING A REVERSE-OSMOSIS DESALINATION SUBSYSTEM

(71) Applicant: ONEKA TECHNOLOGIES, Sherbrooke (CA)

(72) Inventors: Dragan Tutic, Sherbrooke (CA); Elliot Charron, Sherbrooke (CA); Gilbert Perron, Sherbrooke (CA); Jean-Luc Michaud, Saint-Jean-Baptiste (CA); Yannick Caron, Sherbrooke (CA); Alexandre Savard, Sainte-Petronille (CA); Renaud Lafortune, Sherbrooke (CA)

(73) Assignee: ONEKA TECHNOLOGIES, Sherbrooke (CA)

( * ) Notice: Subject to any disclaimer, the term of this patent is extended or adjusted under 35 U.S.C. 154(b) by 13 days.

(21) Appl. No.: 18/254,755

(22) PCT Filed: Nov. 26, 2021

(86) PCT No.: PCT/IB2021/061022
§ 371 (c)(1),
(2) Date: May 26, 2023

(87) PCT Pub. No.: WO2022/113024
PCT Pub. Date: Jun. 2, 2022

(65) Prior Publication Data
US 2025/0035081 A1      Jan. 30, 2025

Related U.S. Application Data

(60) Provisional application No. 63/118,718, filed on Nov. 26, 2020.

(51) Int. Cl.
B01D 61/00          (2006.01)
B01D 61/08          (2006.01)
(Continued)

(52) U.S. Cl.
CPC .............. B01D 61/08 (2013.01); C02F 1/265 (2013.01); C02F 1/441 (2013.01); F03B 13/189 (2013.01);
(Continued)

(58) Field of Classification Search
CPC .. F03B 13/189; F03B 13/187; F05B 2220/62; F05B 2240/95; F05B 2240/93
See application file for complete search history.

(56) References Cited

U.S. PATENT DOCUMENTS 3,918,260 A    11/1975  Mahneke
4,204,406 A    5/1980  Hopfe
(Continued)

FOREIGN PATENT DOCUMENTS

CA          1164308 A1     3/1984
CA          1270421 A1     6/1990
(Continued)

*Primary Examiner* — Julio C. Gonzalez
(74) *Attorney, Agent, or Firm* — BCF LLP

(57)          ABSTRACT

A wave-actuated system for desalination of water by reverse osmosis (RO) has at least one offshore wave energy converter subsystem for pumping salt water and supplying the pumped salt water via a water outlet, a pretreatment subsystem hydraulically connected to the water outlet of the at least one offshore wave energy converter subsystem, and a RO desalination subsystem receiving filtered water from the pretreatment subsystem. The at least one wave-energy converter has a float and a hydraulic cylinder pumping salt water to the RO desalination subsystem. A method for operating a reverse-osmosis desalination subsystem using pressurized salt water supplied by at least one wave energy converter (Continued)

subsystem is described. A method for making a hull is also described.

15 Claims, 31 Drawing Sheets

(51) Int. Cl.

| | |
|---|---|
| *C02F 1/26* | (2023.01) |
| *C02F 1/44* | (2023.01) |
| *F03B 13/18* | (2006.01) |
| *C02F 103/08* | (2006.01) |

(52) U.S. Cl.
CPC .... *C02F 2103/08* (2013.01); *C02F 2201/009* (2013.01); *F05B 2220/62* (2013.01); *F05B 2240/95* (2013.01)

(56) References Cited

U.S. PATENT DOCUMENTS

| | | | |
|---|---|---|---|
| 4,335,576 | A | 6/1982 | Hopfe |
| 4,421,461 | A | 12/1983 | Hicks et al. |
| 4,512,886 | A | 4/1985 | Hicks et al. |
| 4,637,783 | A | 1/1987 | Andeen |
| 4,754,157 | A | 6/1988 | Windle |
| 5,664,518 | A | 9/1997 | Lewit et al. |
| 6,956,299 | B2 | 10/2005 | Serrano Molina et al. |
| 7,045,912 | B2 | 5/2006 | Leijon et al. |
| 7,799,221 | B1 | 9/2010 | Macharg |
| 8,209,973 | B1 | 7/2012 | Frich |
| 8,419,940 | B2 | 4/2013 | Macharg |
| 8,581,433 | B2 | 11/2013 | Sidenmark |
| 8,668,472 | B2 | 3/2014 | Tillotson |
| 8,823,196 | B1 | 9/2014 | Gehring |
| 8,938,957 | B2 | 1/2015 | Frich |
| 9,233,340 | B1 | 1/2016 | Elish et al. |
| 9,243,607 | B2 | 1/2016 | Frich |
| 9,334,860 | B2 | 5/2016 | Knowles, Jr. et al. |
| 9,587,635 | B2 | 3/2017 | Knowles, Jr. et al. |
| 9,845,800 | B2 | 12/2017 | Knowles, Jr. et al. |
| 10,030,645 | B2 | 7/2018 | Knowles et al. |
| 10,087,909 | B2 | 10/2018 | Sheldon-Coulson et al. |
| 10,337,488 | B1 | 7/2019 | Heim |
| 10,473,083 | B2 | 11/2019 | Sheldon-Coulson et al. |
| 10,619,618 | B2 | 4/2020 | Sheldon-Coulson et al. |
| 11,130,097 | B2 | 9/2021 | Lafortune et al. |
| 2005/0077227 | A1 | 4/2005 | Kirker et al. |
| 2006/0065597 | A1 | 3/2006 | Kunczynski |
| 2007/0018458 | A1 | 1/2007 | Martinez |
| 2010/0064679 | A1 | 3/2010 | Straume |
| 2010/0107627 | A1 | 5/2010 | Morgan |
| 2010/0122529 | A1 | 5/2010 | Kroll |
| 2011/0081259 | A1 | 4/2011 | Vowles |
| 2011/0131970 | A1* | 6/2011 | Johnston .............. F03B 17/062 60/497 |
| 2015/0035283 | A1 | 2/2015 | Lee |
| 2015/0266549 | A1 | 9/2015 | Qu |
| 2017/0145984 | A1 | 5/2017 | Matthews et al. |
| 2019/0151798 | A1* | 5/2019 | Lafortune .............. B01D 61/10 |
| 2019/0360452 | A1 | 11/2019 | Qu |
| 2020/0180732 | A1 | 6/2020 | Olsen |
| 2020/0317298 | A1 | 10/2020 | Olsen |

FOREIGN PATENT DOCUMENTS

| | | | |
|---|---|---|---|
| CA | 2683472 | A1 | 10/2008 |
| CA | 2631297 | A1 | 11/2009 |
| CA | 2704403 | A1 | 11/2009 |
| CA | 2722528 | A1 | 11/2009 |
| CA | 2828198 | A1 | 8/2012 |
| CA | 2715601 | C | 5/2016 |
| CA | 2729927 | C | 5/2017 |
| CL | 201803548 | | 1/2019 |
| DE | 3419565 | A1 * | 11/1985 |
| EP | 265594 | B1 | 4/1992 |
| EP | 1342916 | B1 | 9/2006 |
| EP | 1466090 | B1 | 3/2007 |
| EP | 2113657 | A2 | 11/2009 |
| EP | 2128430 | A1 | 12/2009 |
| EP | 2142790 | B1 | 11/2010 |
| EP | 2257708 | A1 | 12/2010 |
| EP | 2324236 | A1 | 5/2011 |
| EP | 2167811 | B1 | 2/2012 |
| EP | 2310665 | B1 | 3/2012 |
| EP | 2679802 | A2 | 1/2014 |
| EP | 3484761 | B1 | 11/2019 |
| FR | 2477237 | A1 | 9/1981 |
| WO | 0248544 | A1 | 6/2002 |
| WO | 03058054 | A1 | 7/2003 |
| WO | 2003060318 | A1 | 7/2003 |
| WO | 2006039534 | A2 | 4/2006 |
| WO | 2008127116 | A1 | 10/2008 |
| WO | 2008135046 | A2 | 11/2008 |
| WO | 2009105011 | A1 | 8/2009 |
| WO | 2009137920 | A1 | 11/2009 |
| WO | 2010004293 | A2 | 1/2010 |
| WO | 2010051630 | A1 | 5/2010 |
| WO | 2011117441 | A1 | 9/2011 |
| WO | 2012073693 | A1 | 6/2012 |
| WO | 2012115456 | A2 | 8/2012 |
| WO | 2013006088 | A1 | 1/2013 |
| WO | 2013049590 | A1 | 4/2013 |
| WO | 2013052447 | A1 | 4/2013 |
| WO | 2013053321 | A1 | 4/2013 |
| WO | 2014100674 | A1 | 6/2014 |
| WO | 2016007699 | A1 | 1/2016 |
| WO | 2016113606 | A1 | 7/2016 |
| WO | 2017012464 | A1 | 1/2017 |
| WO | 2017025012 | A1 | 2/2017 |
| WO | 2017091483 | A1 | 6/2017 |
| WO | 2017210800 | A1 | 12/2017 |
| WO | 2018011187 | A1 | 1/2018 |
| WO | 2018028584 | A1 | 2/2018 |
| WO | 2020069669 | A1 | 4/2020 |
| WO | 2020148961 | A1 | 7/2020 |

* cited by examiner

WAVE-ACTUATED SYSTEM, WAVE ENERGY CONVERTER SUBSYSTEM, AND METHOD FOR OPERATING A REVERSE-OSMOSIS DESALINATION SUBSYSTEM

CROSS-REFERENCE TO RELATED APPLICATION

The present application claims priority to U.S. Provisional Patent Application No. 63/118,718, filed Nov. 26, 2020, the entirety of which is incorporated herein by reference.

TECHNICAL FIELD

The present technology relates to wave-actuated systems, wave energy converter subsystems, and methods for operating a reverse-osmosis desalination subsystem.

BACKGROUND

Desalination of water can be achieved by many methods. Reverse osmosis (RO) has gained popularity since the 1970s and is now more common. The process works by pumping salt water at high pressure inside semi-permeate membranes. When the pressure is higher than the osmotic pressure of the fluid, desalted water is produced.

International Patent Publication No. WO 2017/210800A1 published Dec. 14, 2017 in the name of ONEKA TECHNOLOGIES describes a wave-actuated system for desalination of water by RO including a float under which a hydraulic cylinder is attached. In some embodiments, a cylinder rod is held to the seabed with an anchor. The system further includes a hydraulic system on the float for desalination, including prefilters, valves, a flow exchanger, a hydraulic accumulator and RO membranes. Energy harvesting from brine takes places inside the hydraulic cylinder.

This system includes different parts, such as the hydraulic cylinder, that are underwater, therefore making it difficult to access for maintenance or repairs. For example, divers can be sent to access the underwater parts of the system, but conducting underwater maintenance or repair operations is often difficult to carry out due to underwater visibility that is sometimes poor.

There is thus a desire for system and method for desalination of water by reverse osmosis that can mitigate the aforementioned drawbacks while using the energy from the waves for desalination of water.

SUMMARY

It is an object of the present technology to ameliorate at least some of the inconveniences present in the prior art.

The present technology includes a reverse osmosis desalination subsystem that is hydraulically connected to one or more wave energy converter subsystems actuated by sea waves.

In accordance with one aspect of the present technology, there is provided a wave energy converter (WEC) subsystem including a float, an anchor, and a hydraulic cylinder connected to the float. The hydraulic cylinder includes a cylinder body defining a cylinder axis, a piston slidably received in the cylinder body, and a rod connected to the piston and having a portion extending outside of the cylinder body, the rod and the piston being movable together along the cylinder axis between a retracted position and an extended position. The WEC subsystem further including a line management system having a rod pulley connected to the portion of the rod extending outside of the cylinder body and being movable along the cylinder axis together with the piston and the rod, and a bottom pulley connected to the float. A line is connected between the float and the anchor, and the line engages the rod pulley and the bottom pulley.

In some embodiments, the hydraulic cylinder is disposed generally horizontally.

In some embodiments, the bottom pulley is disposed below the hydraulic cylinder.

In some embodiments, the bottom pulley has a rotation axis, and the bottom pulley is pivotably connected to the float about a pivot axis being orthogonal to the rotation axis.

In some embodiments, the bottom pulley is part of a bottom pulley assembly. The bottom pulley assembly includes at least one tube. The line passes through the at least on tube for maintaining the line engaged with the bottom pulley.

In some embodiments, the line engages the bottom pulley such that a vertical segment of the line is laterally and longitudinally aligned with a center of floatation of the float.

In some embodiments, the line management system further includes a winch connected to the float, the winch being lockable to maintain a predetermined length in the line.

In some embodiments, the line management system further includes a redirection pulley, and the line is engaged in the redirection pulley.

In some embodiments, the WEC subsystem further includes a power source connected to the float and being operatively connected to the winch, and a communication device operatively connected to the power source and the winch for remotely operating the winch.

In some embodiments, the line defines a first segment extending between the winch and the redirection pulley, a second segment extending between the redirection pulley and the rod pulley, a third segment extending between the rod pulley and the bottom pulley, the third segment being disposed below the second segment, and a fourth segment extending between the bottom pulley and the anchor. A first pitch angle is defined between the second segment and the cylinder axis when the rod is in the retracted position, and a second pitch angle is defined between the second segment and the cylinder axis when the rod is in the extended position, the first pitch angle being greater than the second pitch angle.

In some embodiments, the line is one of a rope, a cable, a strap, a belt and a tether.

In some embodiments, the line includes a device for maintaining tension in the line, the device including at least one of at least one of a spring and an elastic cord connected in parallel to the line, and a mass connected to the line.

In some embodiments, the float includes at least two hulls each having a top surface, and the hydraulic cylinder is disposed between the at least two hulls and entirely below top surfaces of the at least two hulls.

In some embodiments, the at least two hulls are fillable using expanding foam.

There is also provided a wave-actuated system for desalination of water by reverse osmosis (RO) including the WEC subsystem as described above, and a RO cell hydraulically connected to the hydraulic cylinder, the hydraulic cylinder supplying salt water to the RO cell.

In some embodiments, the piston defines first and second variable volume chambers within the cylinder body, and the RO cell is hydraulically connected to the first and second variable volume chambers for receiving salt water from the first and second variable volume chambers.

In accordance with another aspect of the present technology, there is provided a wave energy converter (WEC) subsystem for a wave-actuated system. The WEC subsystem includes a float, an anchor, and a hydraulic cylinder connected to the float. The hydraulic cylinder includes a cylinder body defining a cylinder axis, a piston slidably received in the cylinder body, and a rod connected to the piston and having a portion extending outside of the cylinder body, the rod and the piston being movable together along the cylinder axis between a retracted position and an extended position by the action of the waves on the float, the piston defining first and second variable volume chambers within the cylinder body, in the retracted position the first variable volume chamber has a greater volume than the second variable volume chamber, in the extended position the first variable volume chamber has a smaller volume than the second variable volume chamber, the rod extending through the first chamber. The WEC subsystem further includes a first valve selectively hydraulically connecting the first variable volume chamber to a water intake, a line connecting the rod to the anchor, a second valve selectively hydraulically connecting the first and second variable volume chambers to one another, and an accumulator being hydraulically connected to the second variable volume chamber, and selectively hydraulically connected to the first chamber via the first valve, the accumulator and the second variable volume chamber being hydraulically connected to a pressurized water outlet, the first variable volume chamber being selectively connected to the water outlet via the second valve. During a first stroke of the WEC subsystem, the float is moving upward, the piston and the rod are moving towards the retracted position, the first valve is opened, the second valve is closed, salt water is supplied to the first variable volume chamber from the water intake via the first valve, and salt water in the second variable volume chamber is supplied to the accumulator and to the water outlet. During a second stroke of the WEC subsystem, the float is moving downward, the piston and the rod are moving toward the extended position, the first valve is closed, the second valve is opened, salt water contained in the first variable volume chamber is supplied via the second valve to the second variable volume chamber and to the water outlet, and the accumulator supplies salt water to the second variable volume chamber and the water outlet.

In some embodiments, the WEC subsystem further includes a pressure regulator hydraulically connecting the first variable volume chamber, the second variable volume chamber and the accumulator with the water outlet in response to a pressure of salt water supplied by at least one of the first variable volume chamber, the second variable volume chamber and the accumulator to the pressure regulator exceeding a predetermined pressure.

In some embodiments, the first and second valves are one-way valves.

In some embodiments, the WEC subsystem further includes a strainer hydraulically connected between the first valve and the water intake.

In some embodiments, the hydraulic cylinder is disposed generally horizontally.

In some embodiments, the WEC subsystem further includes a rod pulley connected to the portion of the rod extending outside of the cylinder body and being movable along the cylinder axis together with the piston and the rod, and a bottom pulley connected to the float, the line engaging the rod pulley and the bottom pulley.

In some embodiments, the bottom pulley has a rotation axis, and the bottom pulley is pivotably connected to the float about a pivot axis being orthogonal to the rotation axis.

In some embodiments, the bottom pulley is part of a bottom pulley assembly. The bottom pulley assembly includes at least one tube. The line passes through the at least on tube for maintaining the line engaged with the bottom pulley.

In some embodiments, the line engages the bottom pulley such that a vertical segment of the line is laterally and longitudinally aligned with a center of floatation of the float.

In some embodiments, the line management system further comprises a winch connected to the float, and the line is connected to the winch.

In some embodiments, the winch is lockable to maintain a predetermined length in the line.

In some embodiments, the WEC subsystem further includes a power source connected to the float and being operatively connected to the winch, and a communication device operatively connected to the power source and the winch for remotely operating the winch.

In some embodiments, the line management system further comprises a redirection pulley connected to the float, the line being connected to the winch and engaging the redirection pulley.

In some embodiments, the line defines a first segment extending between the winch and the redirection pulley, a second segment extending between the redirection pulley and the rod pulley, a third segment extending between the rod pulley and the bottom pulley, the third segment being disposed below the second segment, and a fourth segment extending between the bottom pulley and the anchor. A first pitch angle is defined between the second segment and the cylinder axis when the rod is in the retracted position, and a second pitch angle is defined between the second segment and the cylinder axis when the rod is in the extended position, the first pitch angle being greater than the second pitch angle.

There is also provided a wave-actuated system for desalination of water by reverse osmosis (RO) including the WEC subsystem described above, and a RO cell hydraulically connected to the first and second variable volume chambers for receiving salt water from the first and second variable volume chambers, the hydraulic cylinder supplying salt water to the RO cell.

In accordance with yet another aspect of the present technology, there is provided a wave-actuated system for desalination of water by reverse osmosis (RO including at least one offshore wave energy converter subsystem for pumping salt water and supplying the pumped salt water via a water outlet, a pretreatment subsystem hydraulically connected to the water outlet of the at least one offshore wave energy converter subsystem, and a RO desalination subsystem receiving filtered water from the pretreatment subsystem.

In some embodiments, the RO desalination subsystem includes an energy recovery pumping device including a hydraulic pump and a hydraulic motor operatively connected to the hydraulic pump, a RO cell hydraulically connected downstream the hydraulic pump, the RO cell having a brine exhaust port and a permeate exhaust port, and a by-pass valve being selectively hydraulically connected between the pretreatment subsystem and the hydraulic motor for selectively supplying filtered water to the hydraulic motor.

In accordance with yet another aspect of the present technology, there is provided a wave-actuated system for desalination of water by reverse osmosis (RO) including at least one offshore wave energy converter subsystem for pumping salt water and supplying the pumped salt water via a water outlet, and a RO desalination subsystem receiving salt water from the at least one offshore wave energy converter subsystem. The RO desalination subsystem including an energy recovery pumping device including a hydraulic pump and a hydraulic motor operatively connected to the hydraulic pump, a RO cell hydraulically connected downstream the hydraulic pump, the RO cell having a brine exhaust port hydraulically connected to the hydraulic motor and a permeate exhaust port, and a by-pass valve being selectively hydraulically connected between the water outlet and the hydraulic motor for selectively supplying water to the hydraulic motor. In response to a pressure of the brine supplied by the RO cell to the hydraulic motor being below a predetermined pressure, the by-pass valve is opened to supply water to the hydraulic motor, and in response to the pressure from the brine supplied by the RO cell to the hydraulic motor being above the predetermined pressure, the by-pass valve is closed.

In some embodiments, the at least one offshore wave energy converter subsystem is a plurality of offshore wave energy converter subsystems.

In accordance with yet another aspect of the present technology, there is provided a method for operating a reverse-osmosis desalination subsystem using pressurized salt water supplied by at least one wave energy converter (WEC) subsystem. The method includes supplying pressurized salt water from the at least one WEC subsystem to a hydraulic pump, supplying the pressurized salt water from the hydraulic pump to a reverse osmosis cell, supplying permeate from the reverse osmosis cell to a reservoir, supplying brine from the reverse osmosis cell to a hydraulic motor to operate the hydraulic motor, the hydraulic motor driving the hydraulic pump, supplying the brine from the hydraulic motor to a discharge, operating a valve hydraulically connected between the at least one WEC subsystem and the hydraulic motor. In response to a pressure of the brine supplied by the reverse osmosis cell to the hydraulic motor being below a predetermined pressure, the method includes opening the valve to supply pressurized salt water from the at least one WEC subsystem to the hydraulic motor, and in response to the pressure from the brine supplied by the reverse osmosis cell to the hydraulic motor being above the predetermined pressure, the method includes closing the valve.

In some embodiments, the method further includes filtering the pressurized salt water using a pretreatment subsystem disposed between at least one WEC subsystem and the hydraulic pump.

In some embodiments, the at least one WEC subsystem is a plurality of WEC subsystems.

In yet another aspect of the present technology, there is provided a method for making a hull including providing an empty, collapsed hull, providing a two-part foam, injecting the two-part foam inside the hull for expanding and at least partially filling the hull, and in response to the two-part foam expanding, the hull taking a predetermined shape.

In some embodiments, the two-part foam is a urethane-based foam.

In yet another aspect of the present technology, there is provided a an ultrafiltration device assembly including a float and an ultrafiltration device connected to the float. The ultrafiltration device includes a housing and ultrafiltration membranes disposed in the housing. The ultrafiltration device is connected to the float such that in use: the ultrafiltration device is submerged in water; and the ultrafiltration device moves in response to the float moving with waves causing the ultrafiltration membranes to rub against each other thereby cleaning the ultrafiltration membranes.

In some embodiments, a rigid member connects the ultrafiltration device to the float.

In some embodiments, a line connects the ultrafiltration device to the float.

In some embodiments, a drag plate is connected to the ultrafiltration device.

In some embodiments, the ultrafiltration membranes are hollow fiber ultrafiltration (HFUF) membranes.

There is also provided a system for desalination of water by reverse osmosis (RO) including the ultrafiltration device assembly described above and a RO cell fluidly connected to the ultrafiltration device to receive filtered water from the ultrafiltration device.

In some embodiments, the system for desalination of water by RO also includes a hydraulic cylinder connected to the float. The ultrafiltration device is fluidly connected between the hydraulic cylinder and the RO cell. In response to the float moving with waves, the hydraulic cylinder pumps filtered water from the ultrafiltration device to the RO cell.

In accordance with yet another aspect of the present technology, there is provided a system for desalination of water by reverse osmosis (RO) including a pump for pumping salt water and a RO desalination subsystem fluidly connected to the pump. The RO desalination subsystem includes: a RO cell hydraulically connected downstream the hydraulic pump, the RO cell having a water intake port, a brine exhaust port and a permeate exhaust port, the water intake port being fluidly connected to the pump to receive salt water from the pump, the brine exhaust port being fluidly connected to a discharge via a first conduit; and a flush valve being selectively hydraulically connected between the brine exhaust port and the discharge for selectively fluidly communicating the brine exhaust port with the discharge via a second conduit. In response to the flush valve being opened, a pressure of the salt water supplied to the water intake port being reduced below an osmotic pressure of the salt water thereby increasing a flow rate of the salt water supplied to the water intake port.

In some embodiments, the system for desalination of water by RO also includes an energy recovery pumping device including the pump and a hydraulic motor operatively connected to the pump. The pump is a hydraulic pump. The first conduit supplies brine to the hydraulic motor.

In some embodiments, the pump is a piston pump. The first conduit supplies brine to the piston pump to actuate the piston pump.

In some embodiments, the system for desalination of water by RO also includes an offshore wave energy converter subsystem operatively connected to the pump for actuating the pump.

In some embodiments, a discharge valve is hydraulically connected between the brine exhaust port and the first conduit. The discharge valve constricts a flow of brine to the first conduit such that the pressure of the salt water supplied to the water intake port is above the osmotic pressure of the salt water when the flush valve is closed.

In some embodiments, a discharge valve is hydraulically connected between the brine exhaust port and the second conduit. The discharge valve regulates a flow of water to the second conduit.

In some embodiments, a pressure exchanger is hydraulically connected between the brine exhaust port and the first conduit. The flush valve is fluidly connected to the brine exhaust port upstream of the pressure exchanger. The pressure exchanger supplies water to the water intake port.

In some embodiments, a flush valve actuator is operatively connected to the flush valve for intermittently opening the flush valve.

In some embodiments, the pump is a piston pump. The first conduit supplies brine to the piston pump to actuate the piston pump. The piston pump is operatively connected to the flush valve actuator to actuate to the flush valve actuator.

In some embodiments, the piston pump mechanically actuates the flush valve actuator.

In some embodiments, the piston pump hydraulically actuates the flush valve actuator.

In some embodiments, an accumulator is fluidly connected between the pump and the water intake port. The accumulator supplies salt water to the water intake port in response to the flush valve being open.

According to yet another aspect of the present technology, there is provided a method for operating a reverse-osmosis desalination subsystem including supplying salt water to a reverse osmosis cell and intermittently opening a flush valve to switch from a permeate production mode to a flushing mode. In the permeate production mode, the method includes: supplying permeate from the reverse osmosis cell to a reservoir; and supplying brine from the reverse osmosis cell to a discharge via a first conduit with a flush valve being closed. In the flushing mode, the method includes: supplying brine from the reverse osmosis cell to the discharge via a second conduit by opening the flush valve, thereby reducing a pressure of the salt water supplied to the reverse osmosis cell below the osmotic pressure of the salt water thereby increasing a flow rate of the salt water supplied to the reverse osmosis cell.

In the present description, the expression "generally horizontally" refers to being between plus or minus 45 degrees from the horizon when the float is at rest floating on calm, still water.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

9

Figure 23:
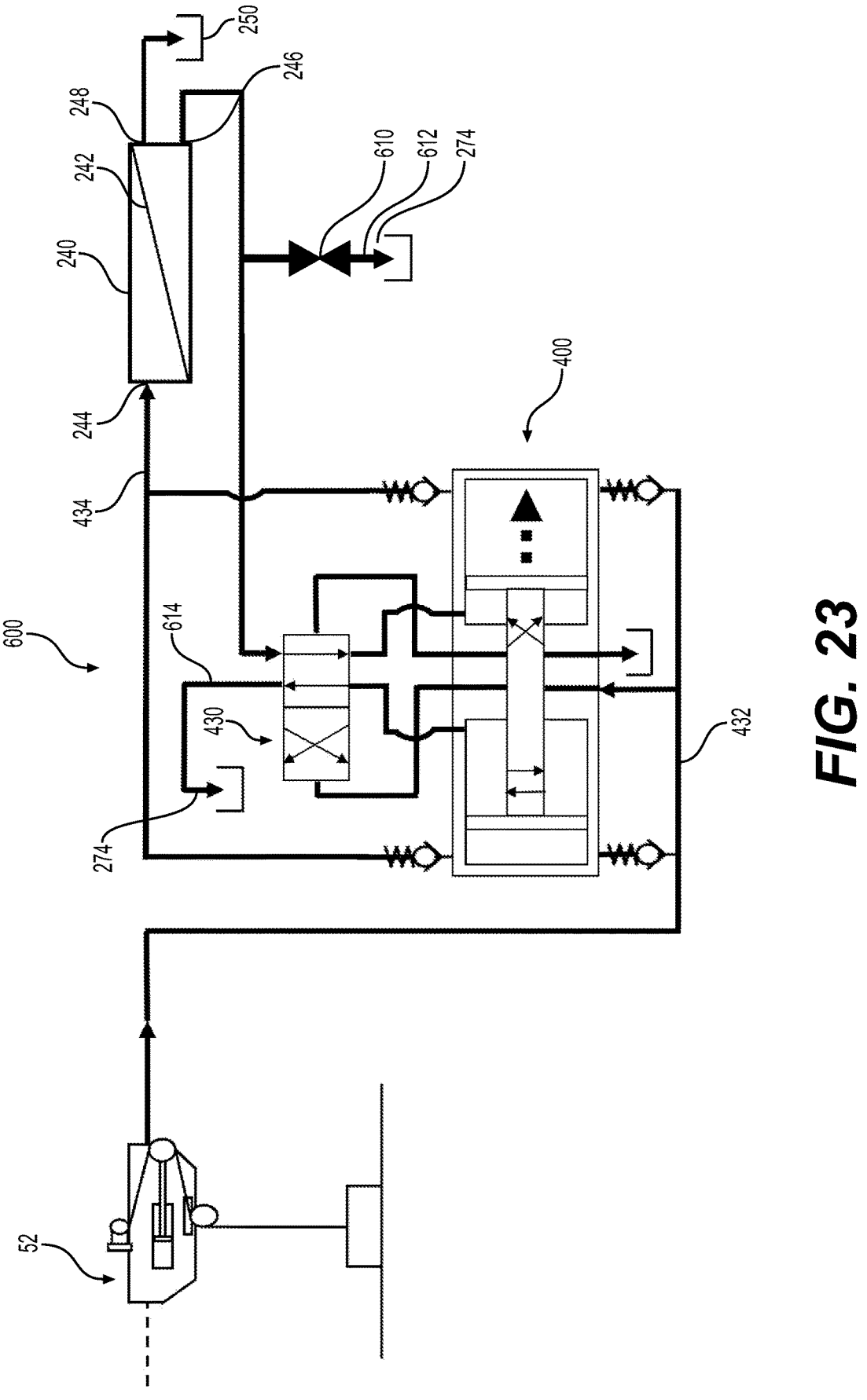
FIG. 23 is a schematic illustration of an alternative embodiment of the system of FIG. 19.
Figure 24:
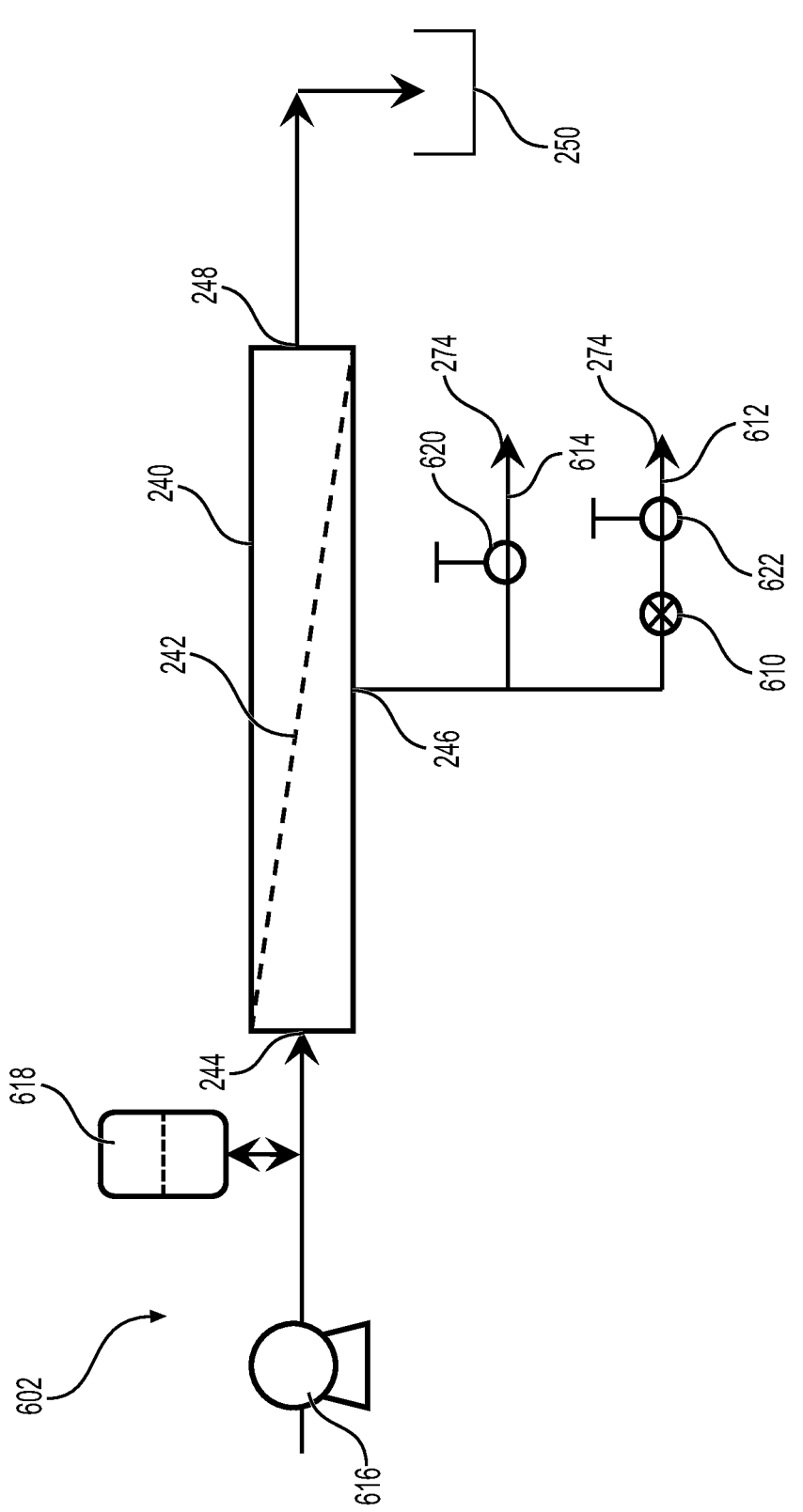
Figure 25:
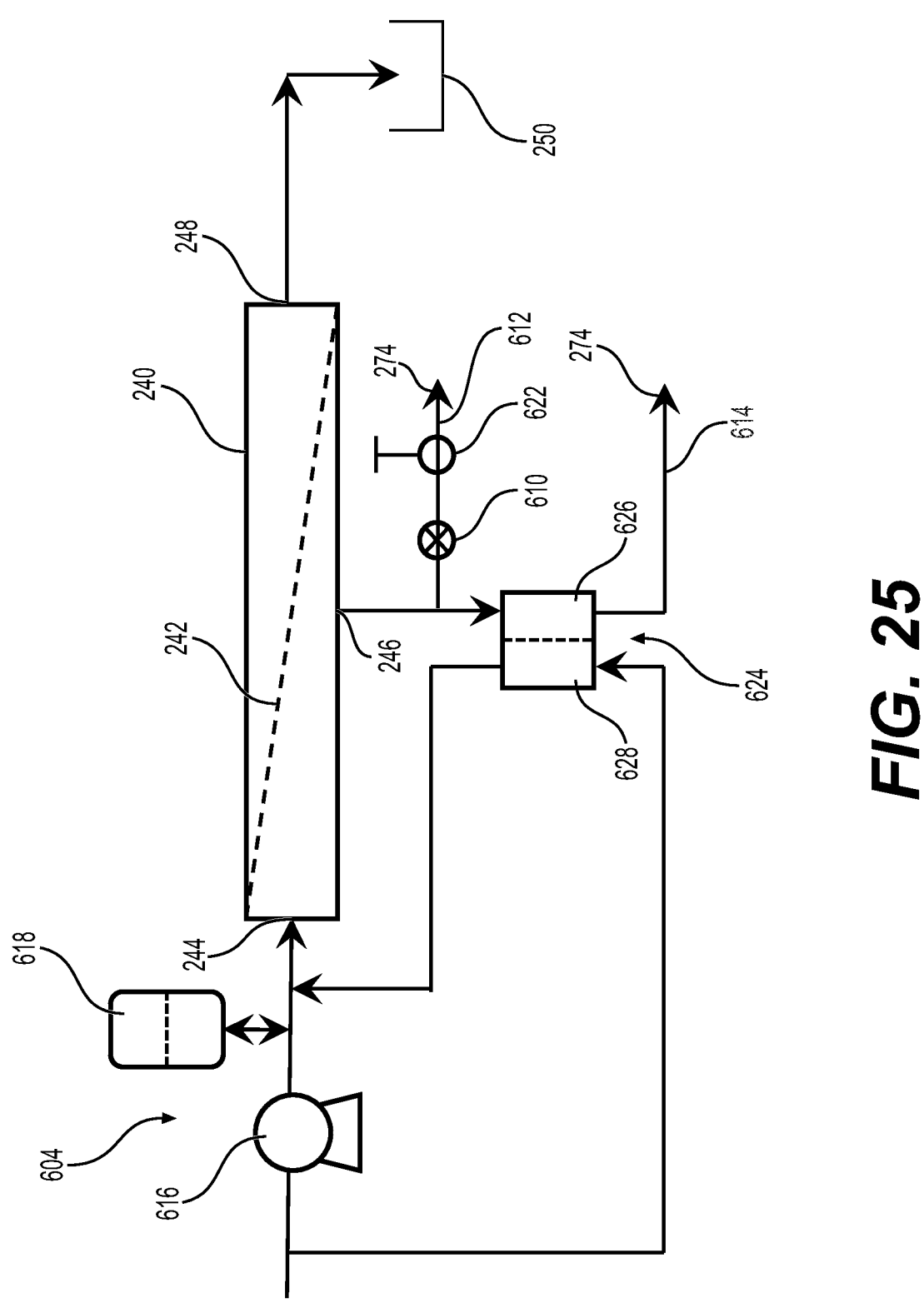
Figure 26:
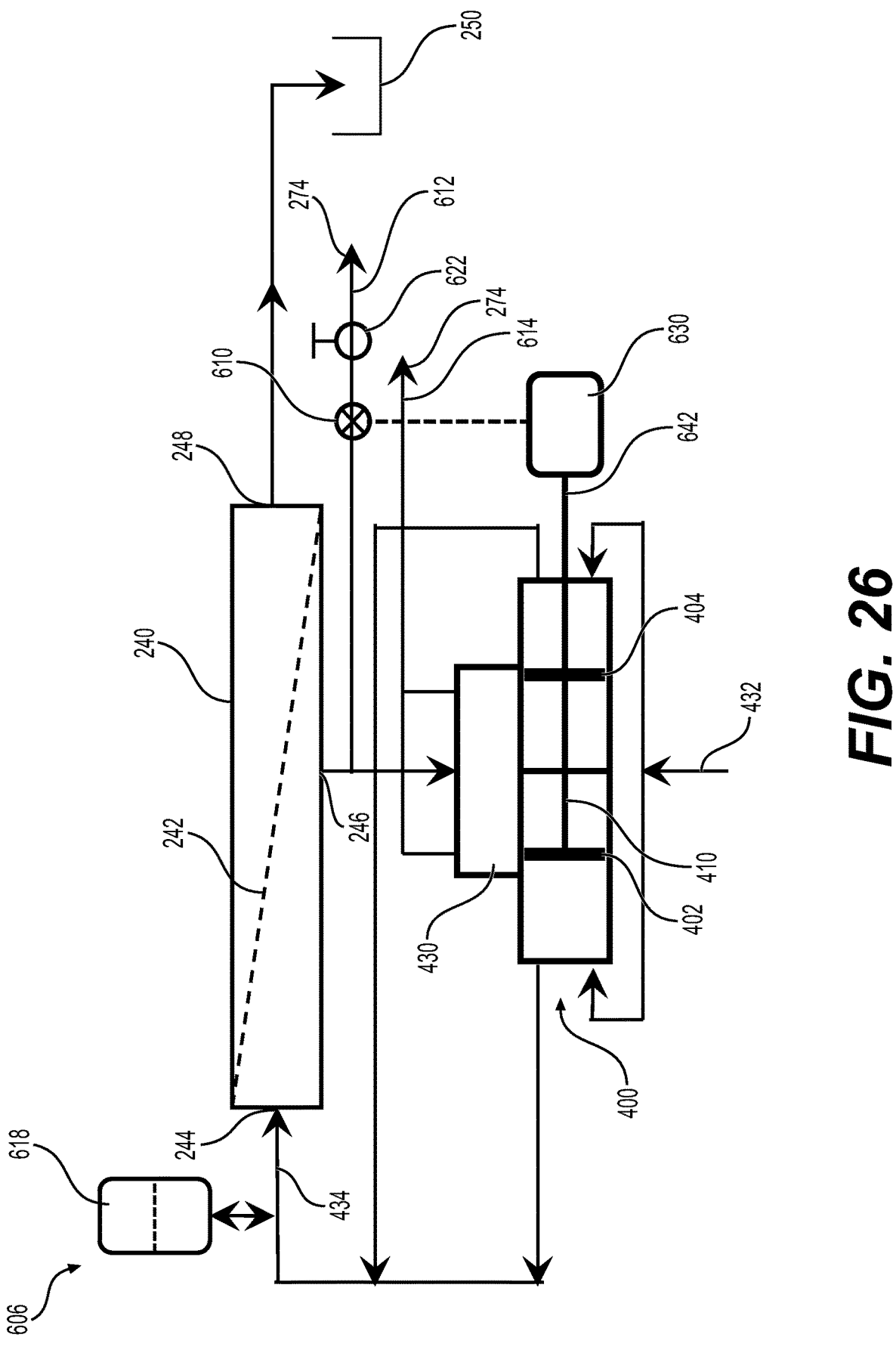
Figures 27, 28:
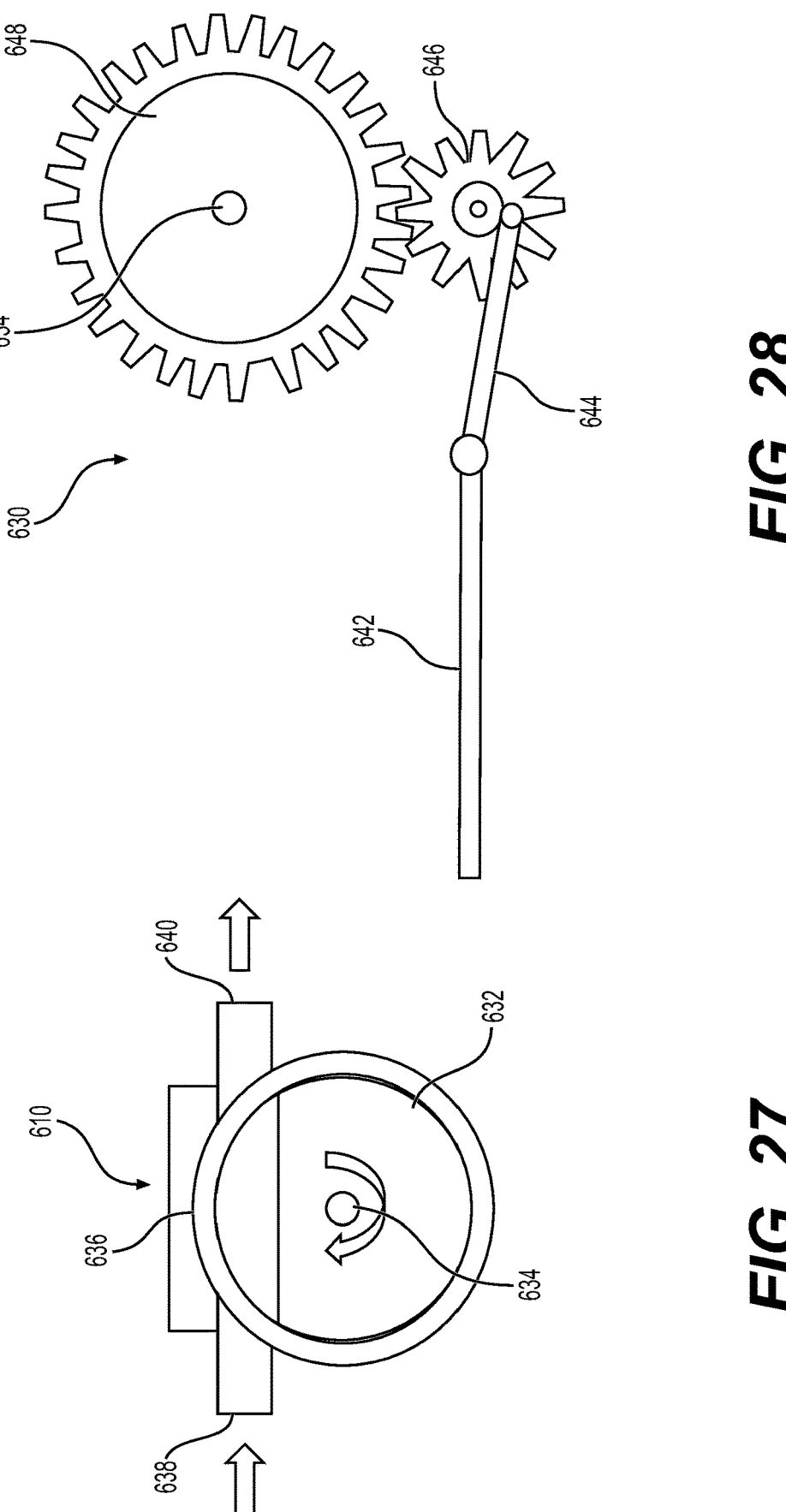
Figure 29:
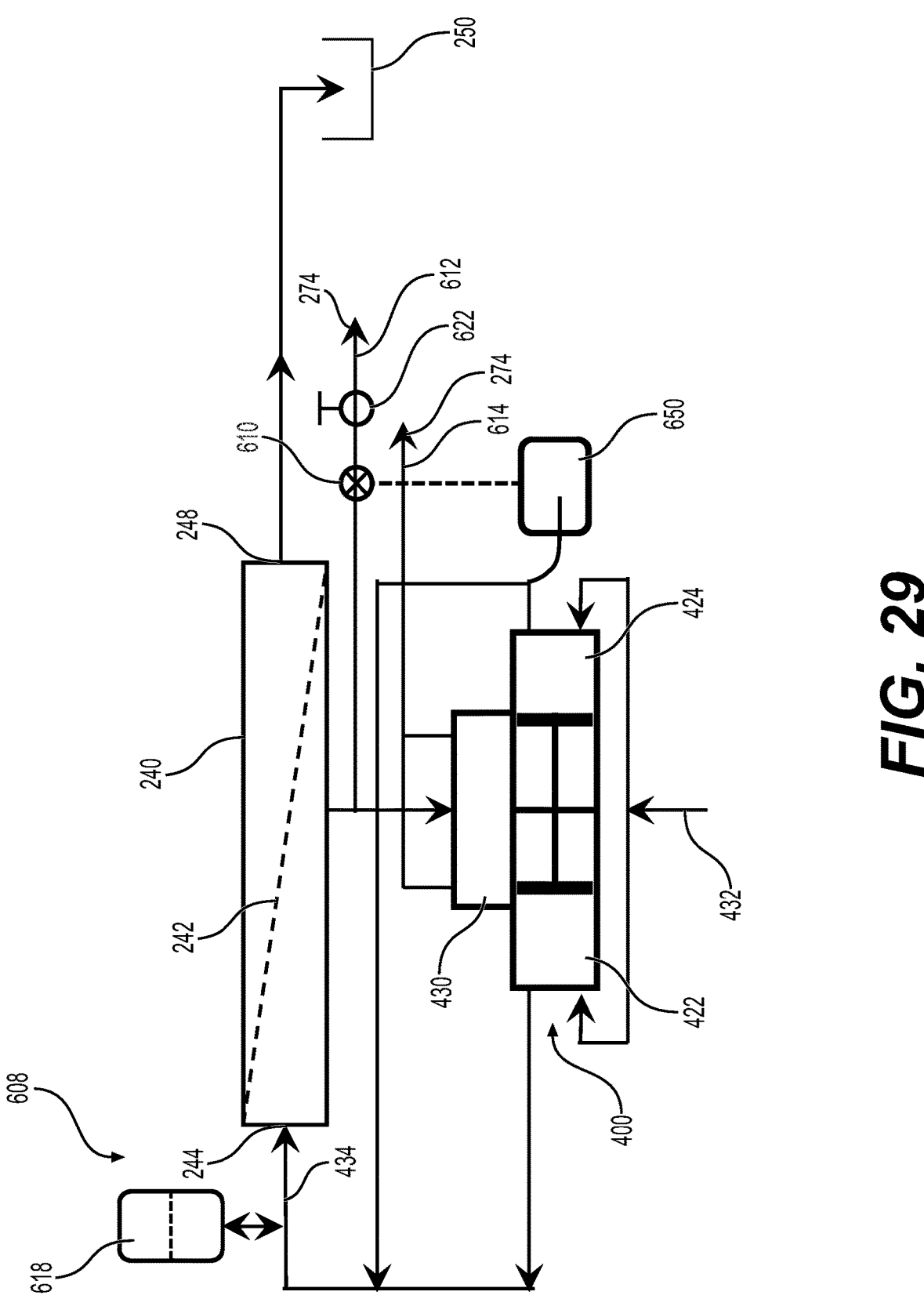
Figure 30:
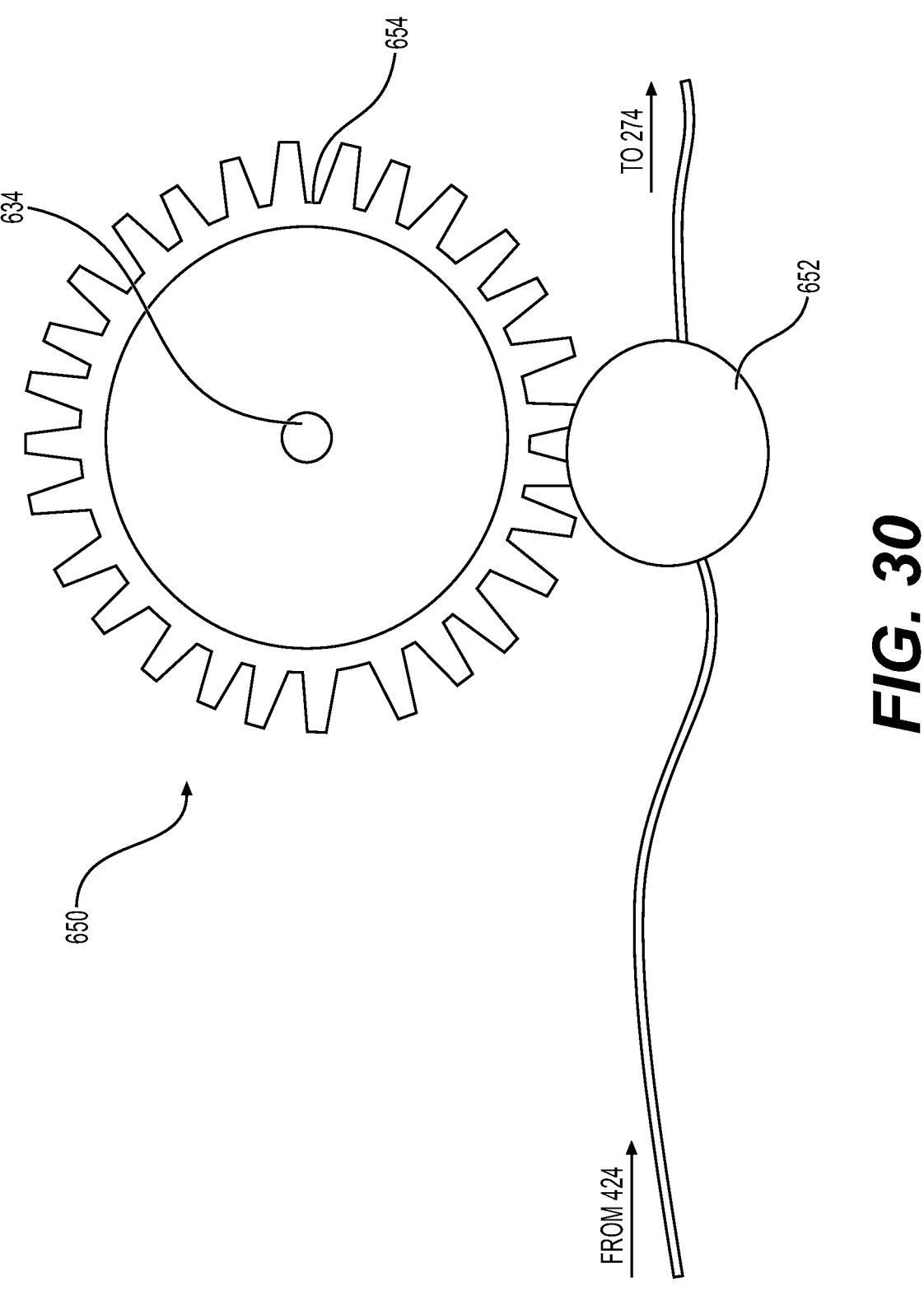

FIG. 24 is a schematic illustration of an alternative embodiment of a desalination subsystem of the system of FIG. 23;

FIG. 25 is a schematic illustration of another alternative embodiment of a desalination subsystem of the system of FIG. 23;

FIG. 26 is a schematic illustration of another alternative embodiment of a desalination subsystem of the system of FIG. 23;

FIG. 27 is a schematic illustration of an embodiment of a flush valve of the desalination subsystem of FIG. 26;

FIG. 28 is a schematic illustration of an embodiment of a flush valve actuator of the desalination subsystem of FIG. 26;

FIG. 29 is a schematic illustration of another alternative embodiment of a desalination subsystem of the system of FIG. 23; and FIG. 30 is a schematic illustration of an embodiment of a flush valve actuator of the desalination subsystem of FIG. 29.

DETAILED DESCRIPTION

Figure 1:
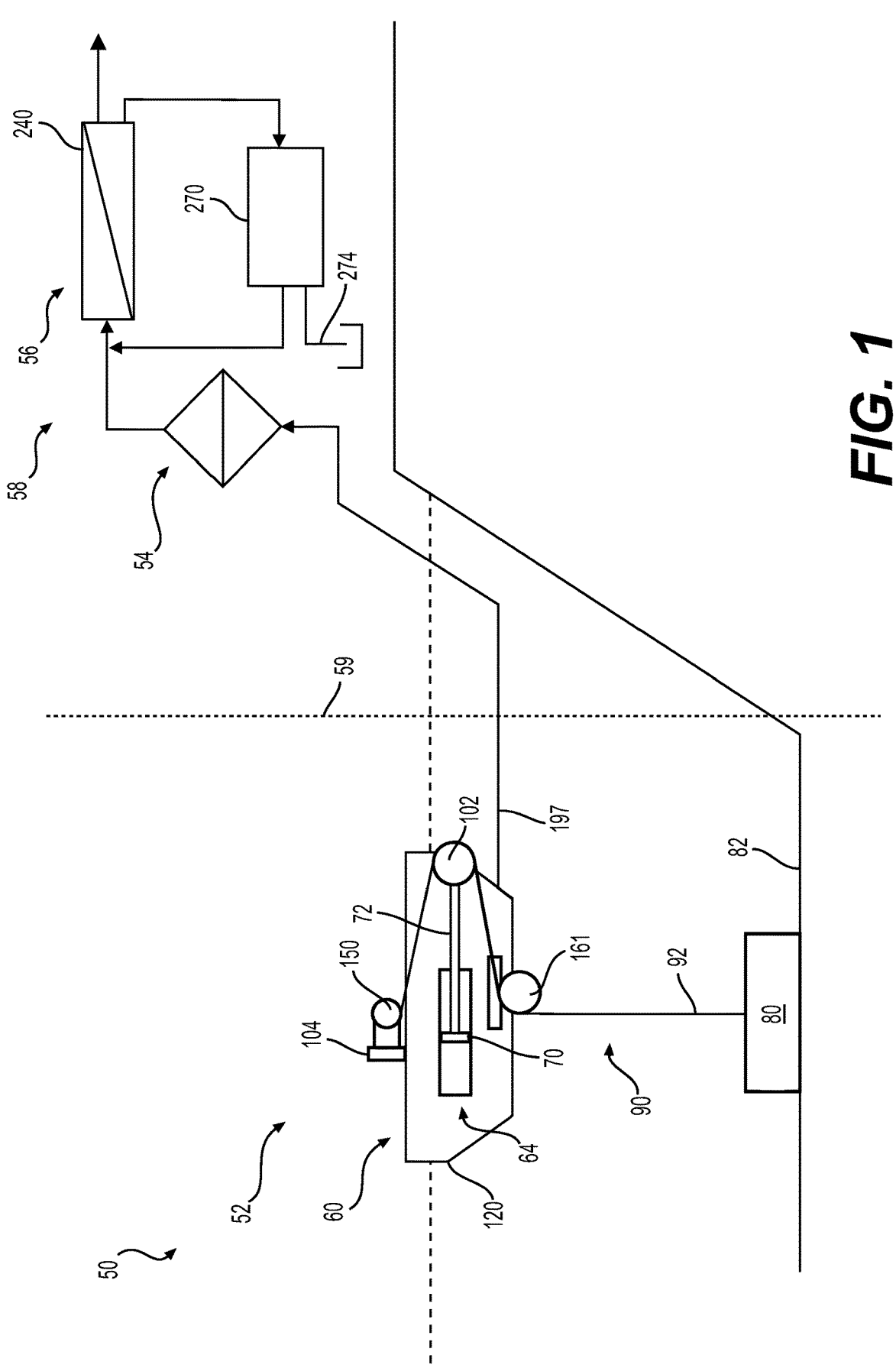
FIG. 1 is a schematic illustration of a wave-actuated system for desalination of water by reverse osmosis, with one offshore wave energy converter (WEC) subsystem hydraulically connected to a desalination plant located onshore.

With reference to FIG. 1, a wave-actuated system 50 converting and using wave energy for desalinating water by reverse osmosis will be generally described. The wave-actuated system 50 is divided in three subsystems: (i) an offshore wave energy converter (WEC) subsystem 52 capable of harvesting energy from the waves for pumping salt water, (ii) a centralized pretreatment subsystem 54 hydraulically connected to the WEC subsystem 52, and (iii) a reverse osmosis (RO) desalination subsystem 56 hydraulically connected downstream the centralized pretreatment subsystem 54. In the accompanying Figures, the pretreatment subsystem 54 and the desalination subsystem 56 are located on land and are part of a desalination plant 58. The delimitation between the WEC subsystem 52 and the pretreatment subsystem 54 and the RO desalination subsystem 56 of the system 50 is schematically indicated by the dotted line 59 in FIGS. 1 and 17. It is contemplated that the pretreatment subsystem 54 and the RO desalination subsystem 56 could be located offshore in some embodiments. Several aspects of the wave-actuated system 50 will be described with reference to the accompanying drawings.

With reference to FIGS. 2 to 13, the WEC subsystem 52 will be generally described. The WEC subsystem 52 includes one or more floats 60. The floats 60 are located offshore in cluster(s) or according to an arrangement that permits efficient harvesting of the sea waves. Each float 60 supports a hydraulic system 62 (FIG. 14) including a hydraulic cylinder 64 that is disposed generally horizontally on board the float 60.

The hydraulic cylinder 64 includes a cylinder body 66 defining a cylinder axis 68, a piston 70 slidably received inside the cylinder body 66, and a rod 72 connected to the piston 70. In some embodiments, the piston 70 and the rod 72 are integrally formed. The float 60 is connected to an anchor 80 lying on the seabed 82 via a line 90. In the present embodiment, the line 90 is a rope 92, but as will be described below, the line 90 could also be a strap, a cable, a belt or a tether in some embodiments. In some embodiments, the rope 92 is selected to have increased resistance to fatigue stresses.

Figure 2:
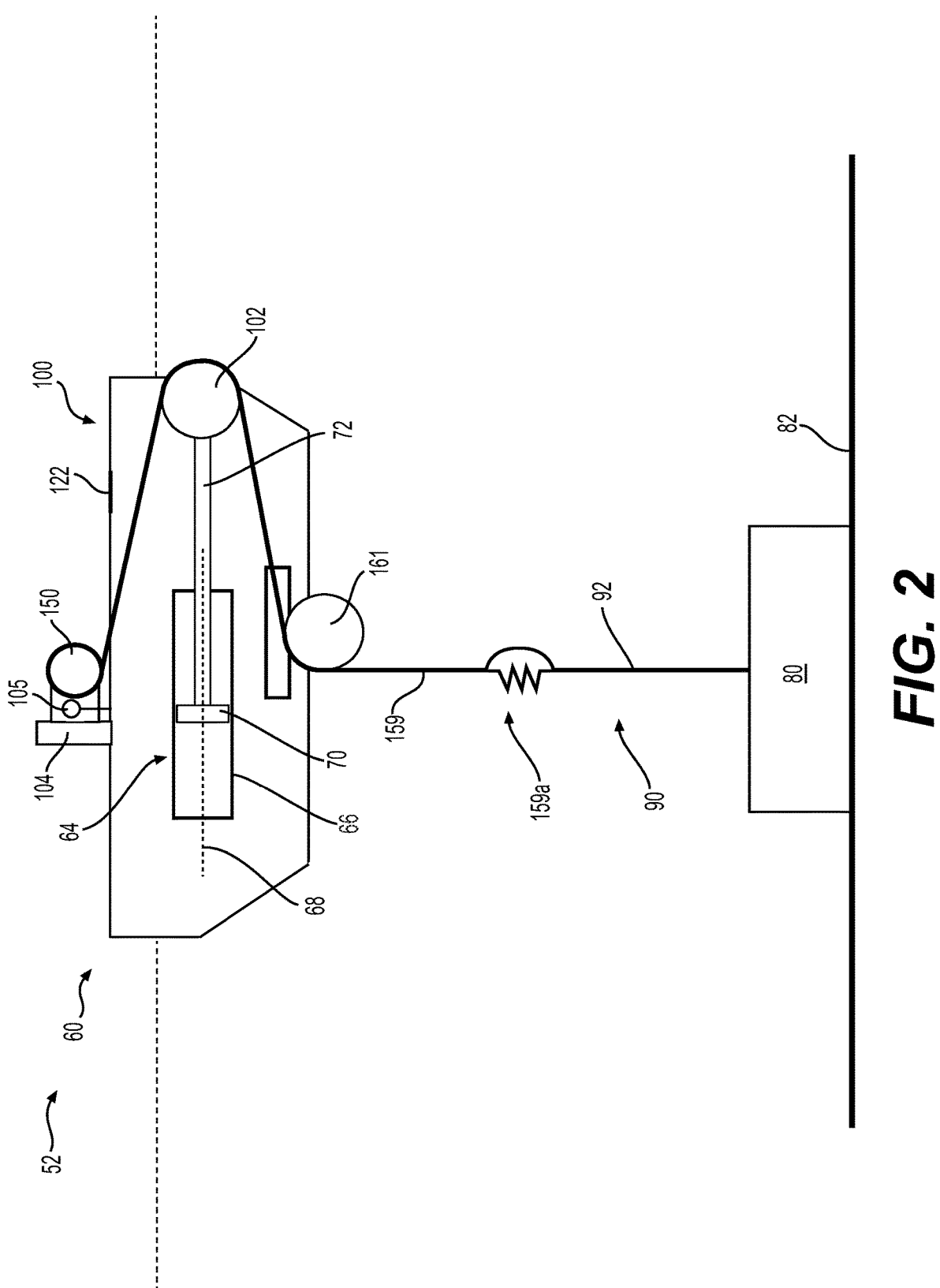
FIG. 2 is a schematic illustration of the wave energy converter (WEC) subsystem of the system of FIG. 1.
Figure 3:
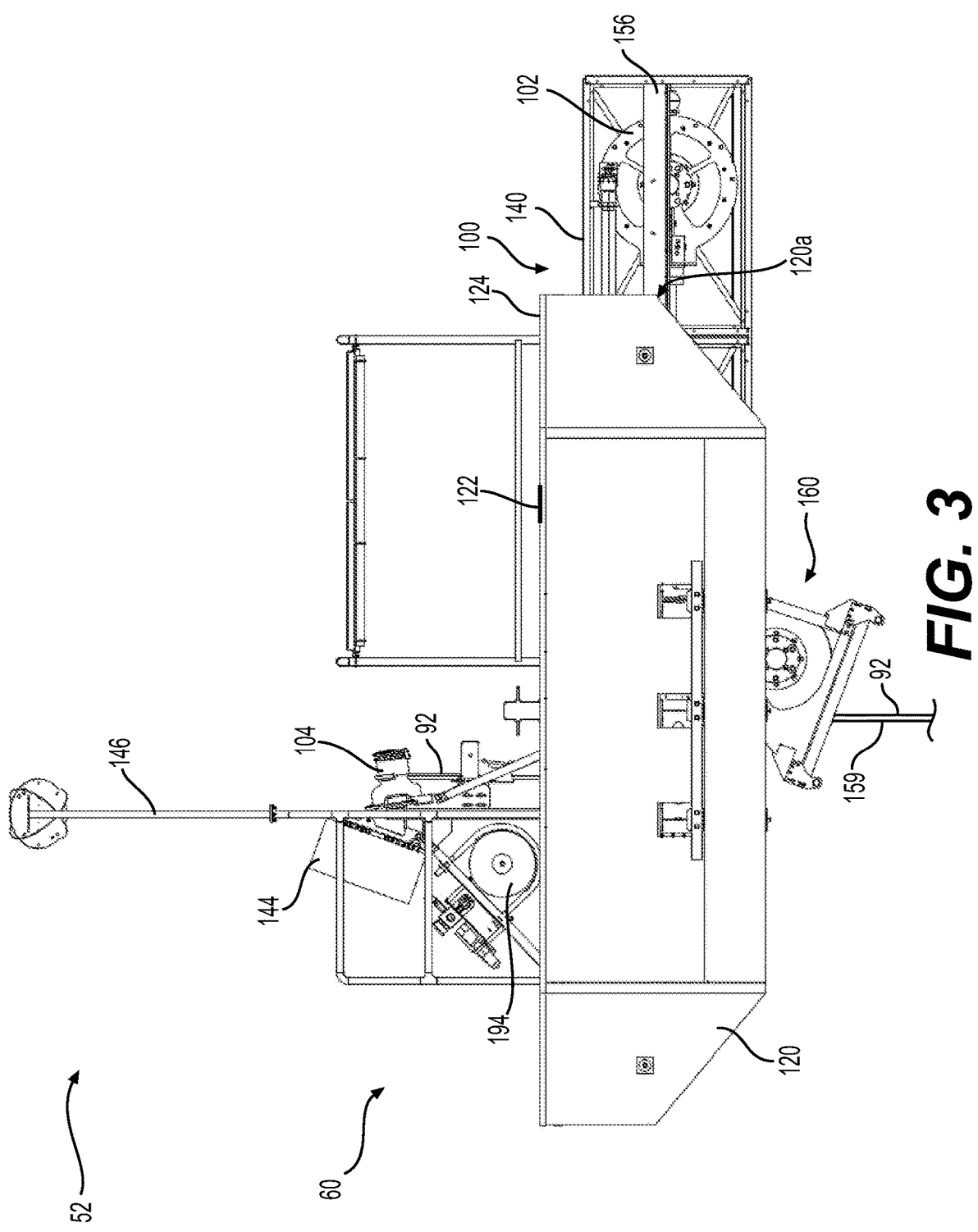
FIG. 3 is a front elevation view of a portion of the WEC subsystem of FIG. 1.

As best seen in FIG. 2, the rope 92 is directed through a line management system 100 on board the float 60. The line management system 100 includes a rod pulley 102 rotatably connected to a portion of the rod 72 extending outside the cylinder body 66. In the present embodiment, the rod pulley 102 is connected to the end portion of the rod 72 opposite the piston 70 extending outside the cylinder body 66. The line management system 100 further includes a winch 104 connected to the float 60 and used to select a length of the rope 92. An anchoring device 105 could also be connected to the float 60 for connecting the rope 92 in addition or in replacement of the winch 104. The line management system 100 will be described in more detail below. When the rope 92 is has the appropriate length, the position of the float 60 is generally vertically above the anchor 80 as shown in the accompanying Figures. As will be described below, when the float 60 goes up with the action of the waves (i.e. when the float 60 is on top of a wave crest), the rope 92 and the line management system 100 make the rod 72 move inside the cylinder body 66, thus moving the piston 70 for pumping salt water in the hydraulic system 62.

The construction of the float 60 will now be described in more detail with reference to FIGS. 3 to 10. The float 60 has two laterally spaced apart, parallel hulls 120, thus making the float 60 a catamaran-type float. It is contemplated that the float 60 could have more than two hulls 120 in some embodiments. Each of the hulls 120 has a top surface 122, and a bridge 124 (FIGS. 3 and 4) is supported on the top surfaces 122 of the hulls 120. The bridge 124 extends between the hulls 120 for allowing access to a user to different components of the WEC subsystem 52.

Figures 5A, 5B:
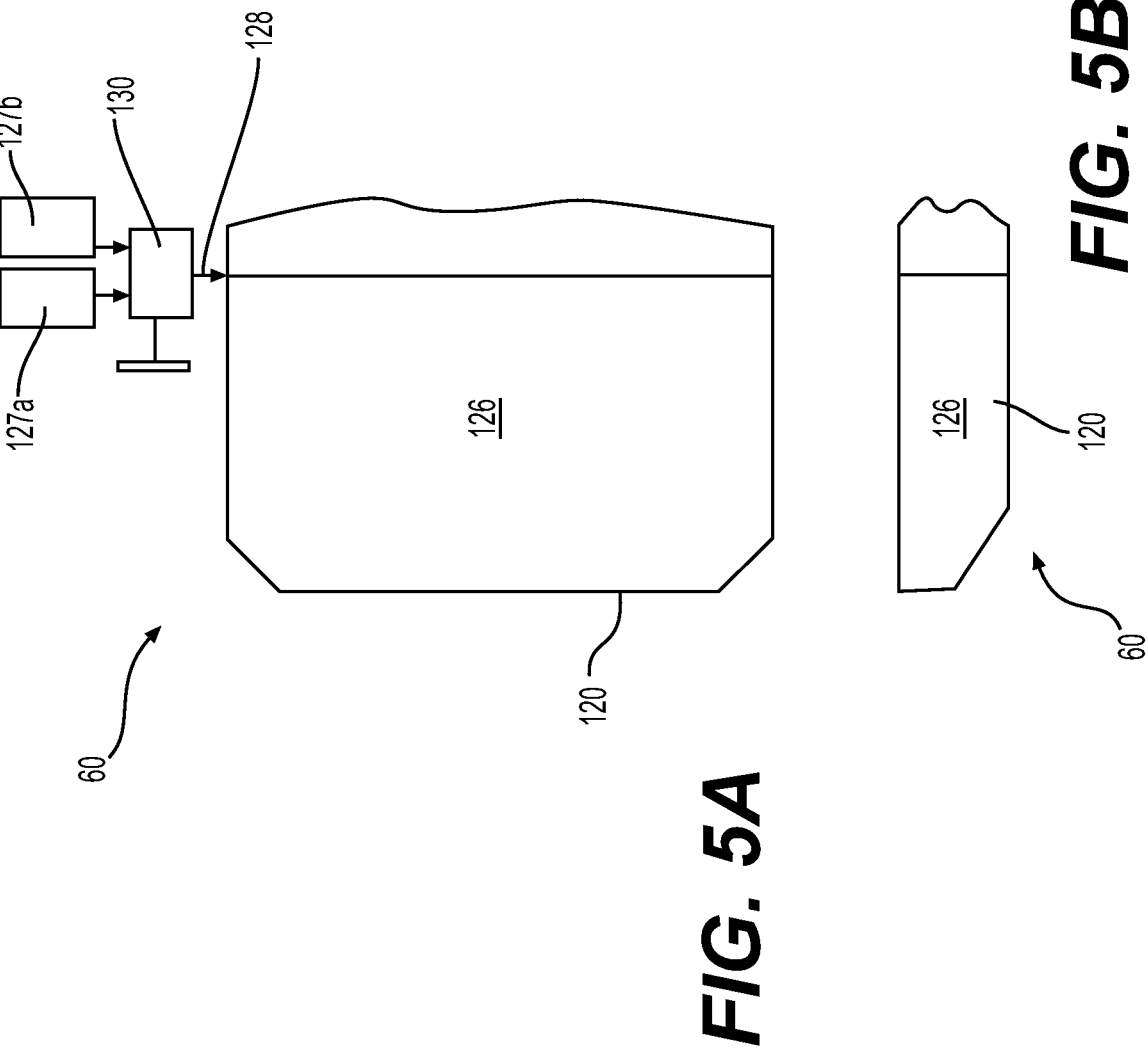
FIG. 5A is a schematic top view of a portion of the hull of the WEC subsystem of FIG. 3, with the hull being filled with expanding foam.
FIG. 5B is a schematic front elevation view of the portion of the hull of FIG. 5A.

Referring to FIGS. 5A, 5B, 6A and 6B, in one embodiment, the hulls 120 are shipped as collapsed, empty bags to the location where the WEC subsystem 52 is to be deployed, and the hulls 120 are fillable onshore using expanding foam 126 prior to deployment of the WEC subsystems 52 at sea. It is contemplated that other suitable types of foam could be used. In the present embodiment, the foam 126 is an expanding urethane-based foam that has a high proportion of closed cells, low water absorption, relatively low density and that can be relatively rigid when set. Referring to FIG. 5A, the foam 126 is a two-part foam that is initially provided as two distinct constituents contained in separate reservoirs 127a, 127b. When mixed, the constituents expand and set to form the foam 126. Each hull 120 is provided with one or more ports 128. The hull 120 can be made of various fabric, fibers and/or panels, such as DYNEEMA™, NYLON™ or KEVLAR™. The hull 120 can also be constructed as a flexible shell or a multi-segments foldable bag, similar to an inflatable mattress.

When the hull 120 is ready to be filled, the two constituents are mixed using mixer 130, such as a screw mixer, and are injected via the port 128. The foam 126 expands in the hull 120 and fills the hull 120 until the hull 120 has taken its final, desired shape. Excess foam and air may be expelled from the hull 120 by the port 128 or, for example, via interstitial spaces defined in the stitching connecting panels of fabric forming the hull 120. The foam 126 sets after a certain amount of time and provides the hull 120 with a relatively rigid filler material that is also of relatively low density.

Figures 6A, 6B:
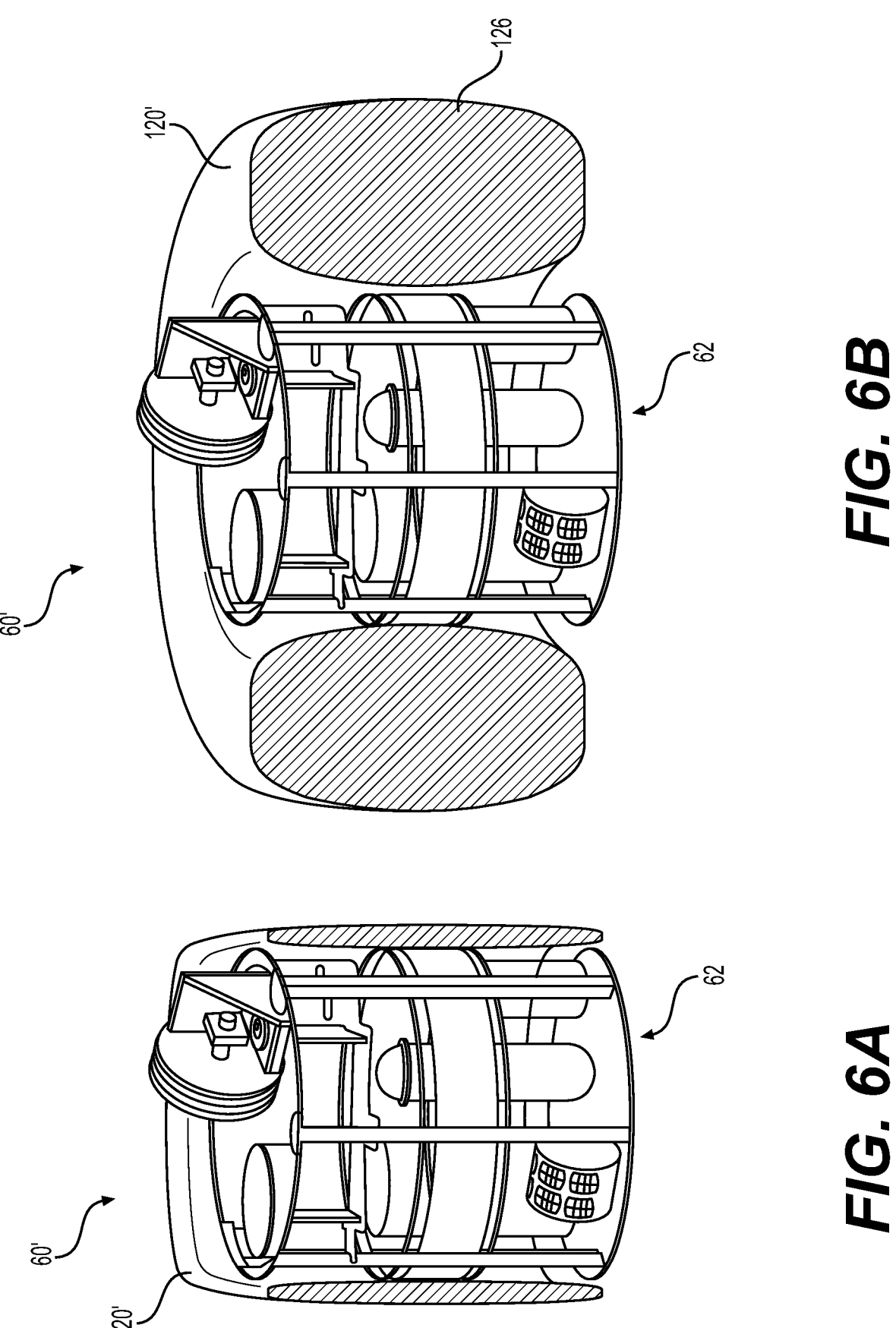
FIG. 6A is a perspective view of a partial cross-section of an alternative embodiment of a hull for a WEC subsystem, with the hull being empty and collapsed.
FIG. 6B is a perspective view of a partial cross-section of the hull and WEC subsystem of FIG. 6A, with the hull being filled with expanding foam to its final, desired shape.

In FIGS. 6A and 6B, there is shown an alternative embodiment of float 60' with a hull 120' having a toroidal shape after having been filled using foam 126. The float 60' includes the same components as float 60, and the hydraulic system 62 is in the middle of the float 60'. Thus, the WEC subsystem 52 could be fitted to the float 60'. The float 60' is only provided for illustration purpose and will not be described in detail. As can be seen in FIGS. 6A and 6B, providing the float 60' with the hull 120' deflated (FIG. 6A) takes less volume than when the hull 120' is filled with foam 126 (FIG. 6B), which may render shipping of the float 60' to the site of deployment of the WEC subsystem 52 more cost effective. Moreover, filling the hulls 120 with the foam 126 is performed without using pumps and ensures that the hulls 120 remain buoyant even if the fabric forming the hull 120 is punctured or ruptured.

Figure 4:
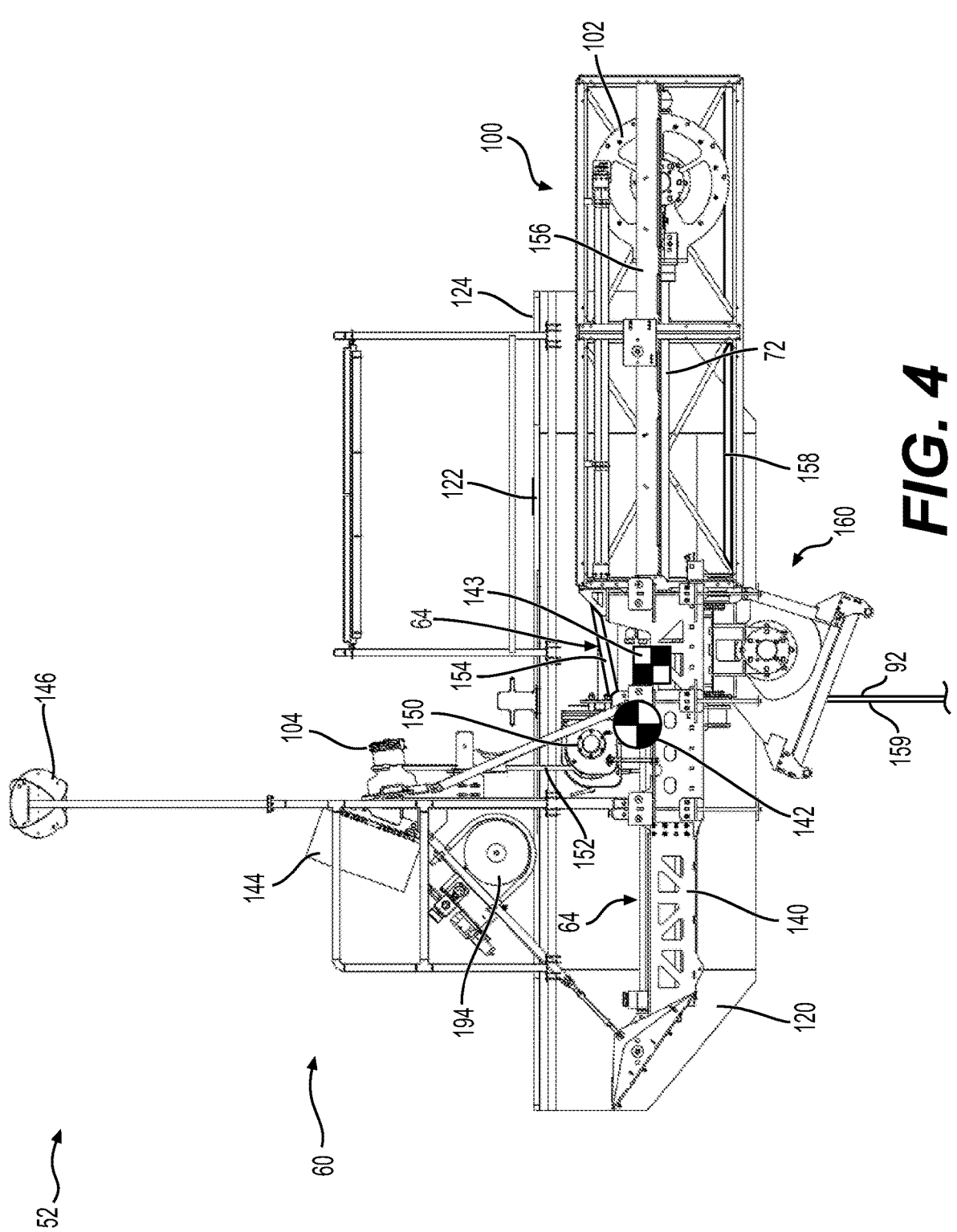
FIG. 4 is a front elevation view of the portion of the WEC subsystem of FIG. 3, with one hull of the float removed.
Figure 7A:
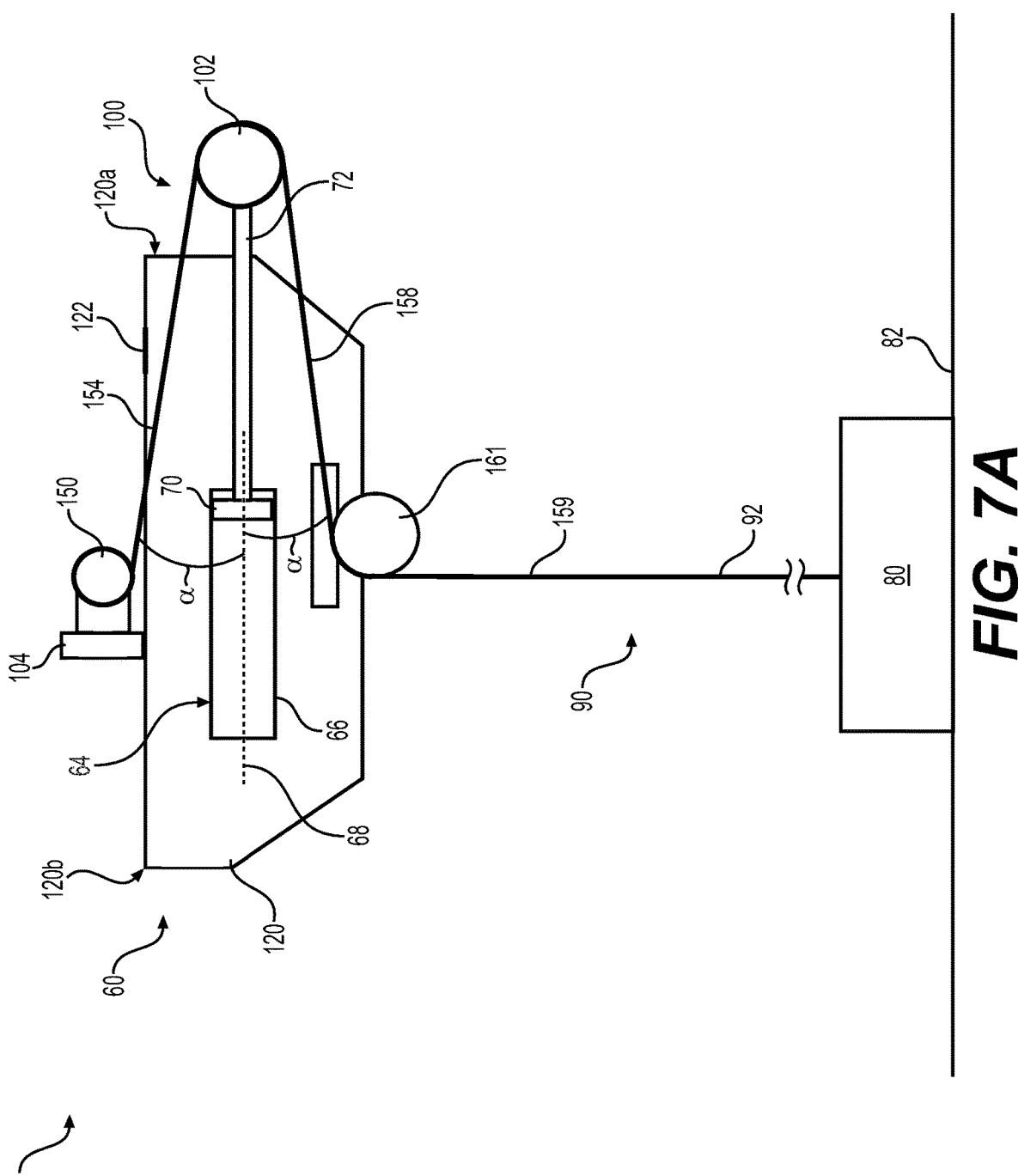
FIG. 7A is a schematic illustration of the WEC subsystem of FIG. 1, with the piston and rod being in an extended position when the float is in a wave trough.
Figure 7B:
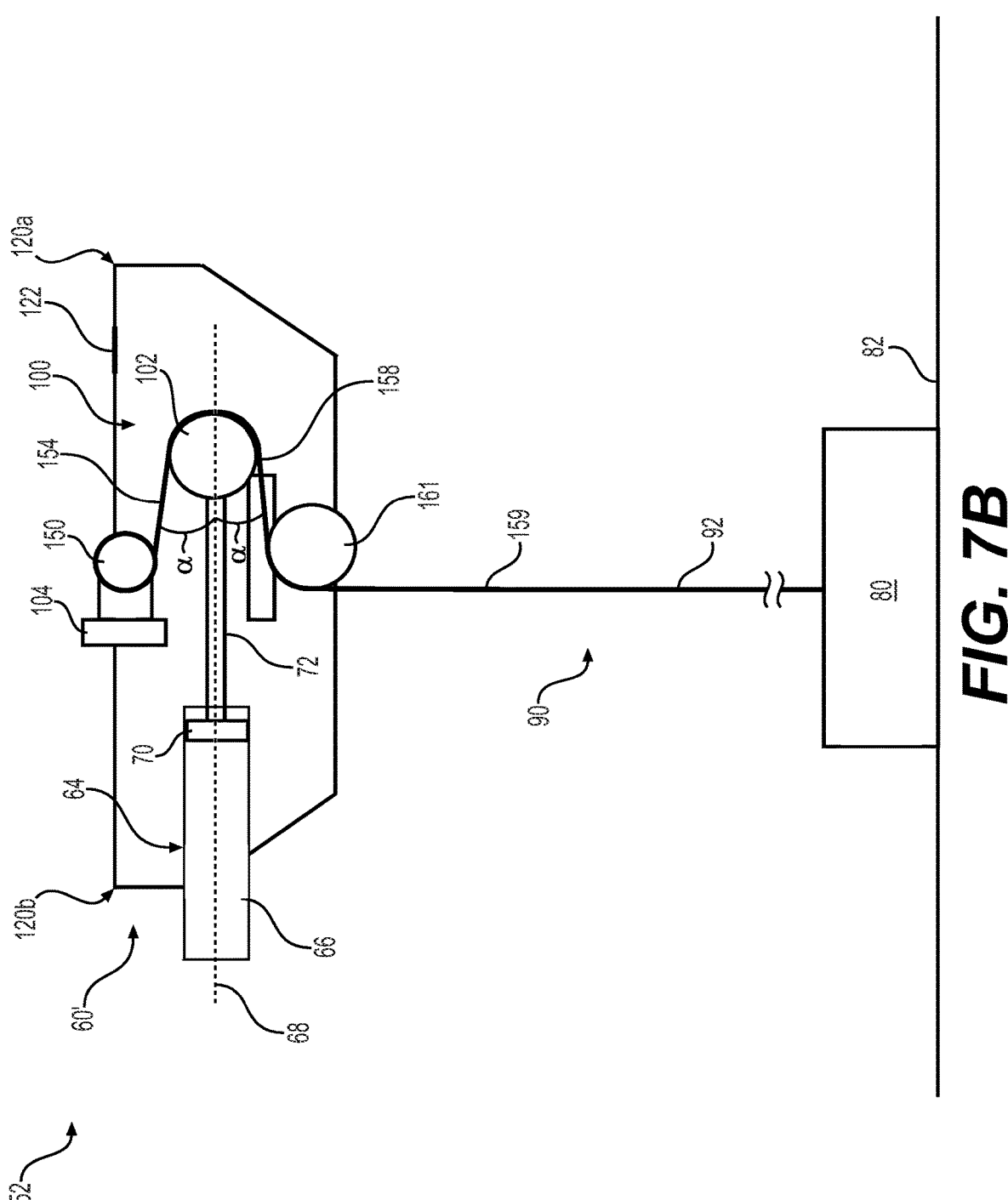
FIG. 7B is a schematic illustration of an alternative embodiment of the WEC subsystem of FIG. 7A, with the piston and rod being in an extended position when the float is in a wave trough.
Figure 8A:
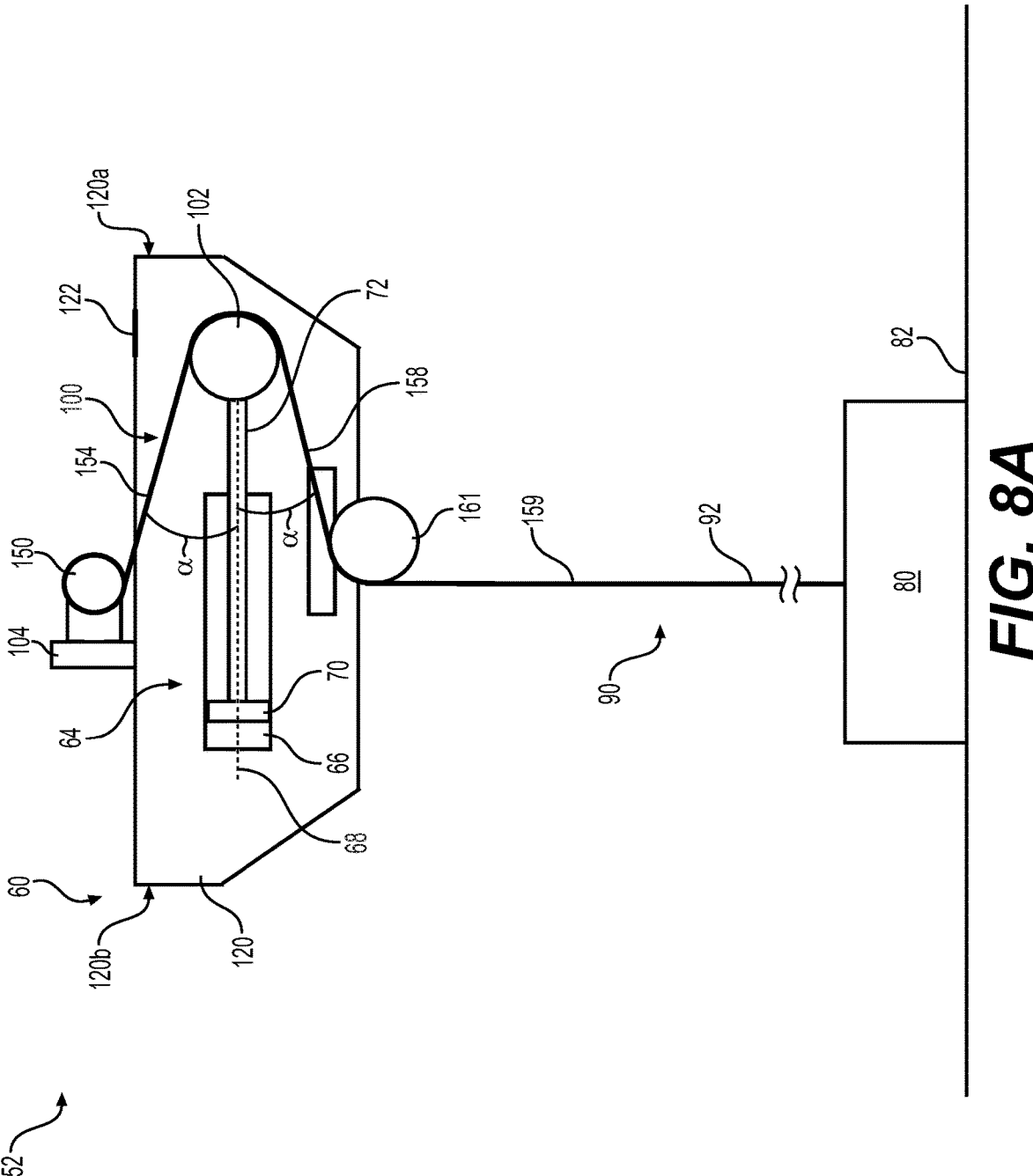
FIG. 8A is a schematic illustration of the WEC subsystem of FIG. 1, with the piston and rod being in a retracted position when the float is on a wave crest.

Referring now to FIGS. 4, 7 and 8, the hydraulic cylinder 64 is disposed generally horizontally between the hulls 120 and is connected to the hulls 120 via a frame 140. Having the hydraulic cylinder 64 disposed between the hulls 120 lowers a center of gravity 142 (FIG. 4) of the float 60 compared to having the hydraulic cylinder 64 above the hulls 120. Moreover, the hydraulic cylinder 64 is disposed between the hulls 120 to maintain a center of floatation 143 in a central region of the float 60. The float 60 is thus more stable and less susceptible to capsize. The winch 104 is disposed above the hydraulic cylinder 64 and is also connected to the frame 140. The winch 104 is lockable to maintain a predetermined length of the rope 92. The winch 104 is an electric winch, or could be a manually operable winch in other embodiments. In the present embodiment, the electric winch 104 is operatively connected to a power source 144 (shown in FIGS. 3 and 4) and to a communication device 146 allowing for remote operation thereof. In the present embodiment, the power source 144 is a battery. The battery is recharged by a solar panel or a wave activated electric generator (not shown). Other types of power source 144 and recharging devices are contemplated. For example, it is contemplated that a turbine powered by a flow of brine out of the RO desalination subsystem 56 could be used as the power source 144 and/or recharging device. The length of the rope 92 can thus be adjusted remotely using the winch 104 depending on the condition of the rope 92, tide level, and/or weather conditions.

Referring to FIG. 4, the line management system 100 will be described in more detail. The line management system 100 is connected to the frame 140. The line management system 100 includes a redirection pulley 150 disposed vertically between the winch 104 and the hydraulic cylinder 64. The redirection pulley 150 redirects the rope 92 from a segment 152 extending between the redirection pulley 150 and the winch 104 to a segment 154 extending between the redirection pulley 150 and the rod pulley 102. The rod pulley 102 is slidably supported by guide rails 156 connected to the frame 140 in order to maintain the rod 72 in alignment with the hydraulic cylinder 64 when moving between the extended and retracted positions (FIGS. 7 and 8). The rod pulley 102 is movable between the hulls 120 together with the rod 72 and piston 70. When the rod 72 is in the extended position (FIG. 7), the rod pulley 102 is located past the ends 120a of the hulls 120. When the rod 72 is in a retracted position (FIG. 8), the rod pulley 102 is located between the ends 120a and the ends 120b of the hulls 120.

From the rod pulley 102, the rope 92 extends along a segment 158 to a bottom pulley 161. The bottom pulley 161 redirects the rope 92 from the segment 158 to a generally vertical segment 159 which extends underwater to the anchor 80. The bottom pulley 161 is disposed between the hulls 120 and below the hydraulic cylinder 64. The bottom pulley 161 is offset such that the segment 159 of the line 90 is laterally and longitudinally aligned with the center of floatation 143 of the float 60.

It is to be noted that the segment 159 of the rope 92 includes a device 159a (schematically shown in FIG. 2) such as a spring or an elastic cord mounted in parallel to the rope, or a mass adapted to maintain tension and avoid slack in the segment 159 of the rope 92. The winch 104 can also be used to reel-in the rope 92 to maintain a predetermined length in the rope 92. For example, should the rope 92 stretch after a certain amount of time, the winch 104 could be remotely operated to reel-in the rope 92 and maintain a predetermined length in the rope 92.

The construction of the float 60 provides that only a portion of the rope 92 and the anchor 80 are underwater. The other components of the float 60, including the hydraulic system 62, remain at least partially above water thus making them accessible from the surface. In some embodiments, it is contemplated that the float could larger than the float 60 and that the hydraulic system 62 remains entirely above water. This feature facilitates maintenance operations compared to other WEC subsystems having their hydraulic system underwater. Furthermore, the float 60, being a catamaran-type float, has a low draft with a shape and geometry approaching that of a boat, which facilitates towing at sea.

Furthermore and referring to FIGS. 7 and 8, a pitch angle $\alpha$ is defined between the segments 154, 158 of the rope 92 and the rod 72 moving along the cylinder axis 68 between the extended and retracted positions. In the present embodiment, the pitch angles $\alpha$ between the segments 154, 158 and the rod 72 are equal, but they could be different in other embodiments. During operation of the hydraulic cylinder 64, the pitch angle $\alpha$ changes. When the rod 72 is in or near the extended position (FIG. 7), the pitch angle $\alpha$ between the rod 72 and the segments 154, 158 is smaller than when in or near the retracted position (FIG. 8), thus causing the application of more horizontal forces by the rope 92 engaging the rod pulley 102 when the rod 72 is in or near the extended position. Conversely, when the rod 72 is in or near the retracted position (FIG. 8), the pitch angle $\alpha$ between the rod 72 and the segments 154, 158 is greater than in or near the extended position (FIG. 7), thus causing the application of less horizontal force by the rope 92 engaging the rod pulley 102 when the rod 72 is in or near the retracted position, and causing a mechanical advantage to the force applied by the rod 72 when the rod 72 is near or at the retracted position. This progressive increase in mechanical advantage enables a gradual resistance and force increase to avoid sudden impacts. As such, this feature assists in protecting the hydraulic cylinder 64 and the components of the WEC subsystem 52 from extreme forces at the end of stroke (for example during storms).

Figure 8B:
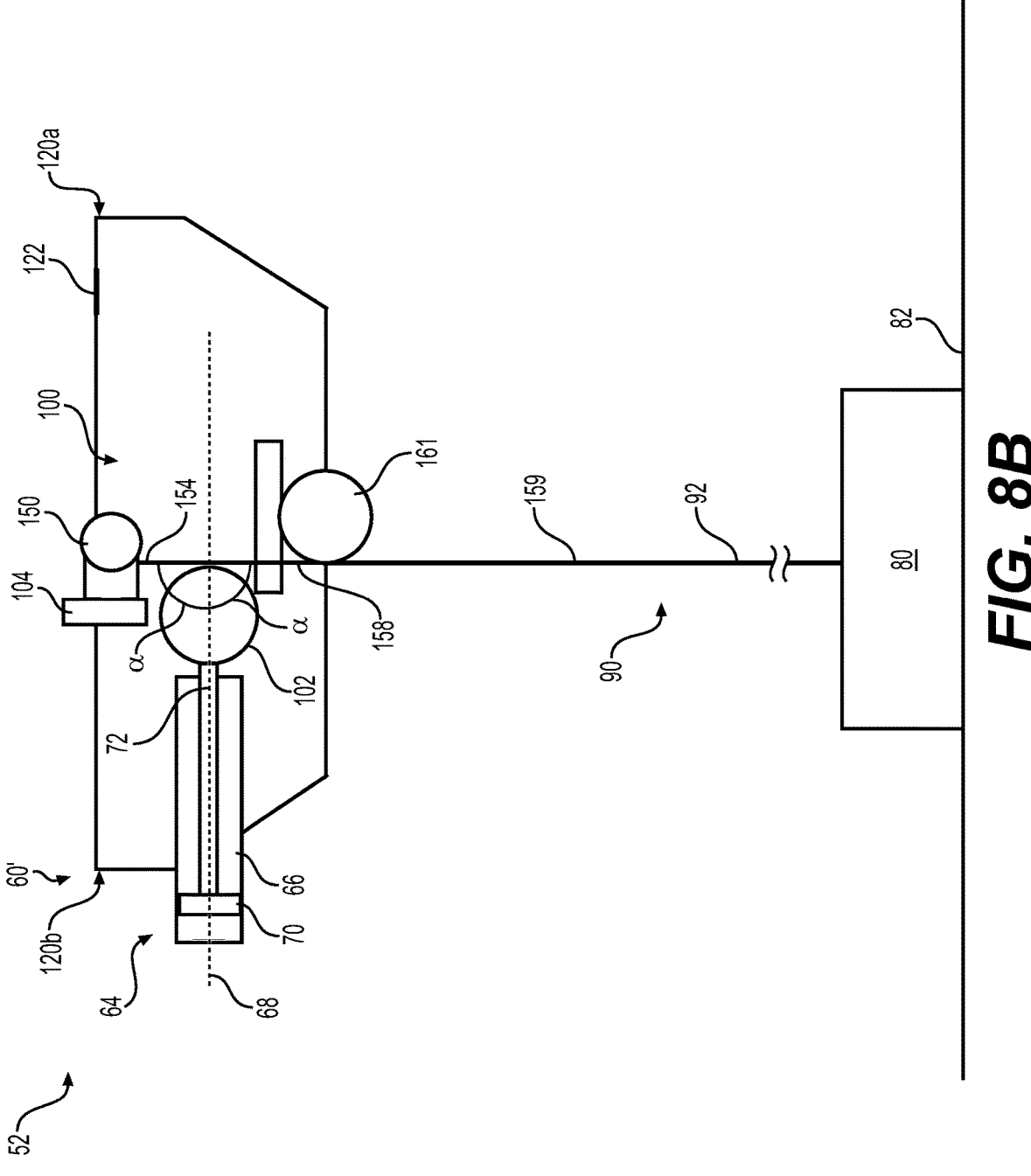
FIG. 8B is a schematic illustration of the alternative embodiment of the WEC subsystem of FIG. 7B, with the piston and rod being in a retracted position when the float is on a wave crest.

Referring to FIGS. 7B and 8B, the WEC subsystem 52 includes a float 60' that is an alternate embodiment of the float 60 and including components that are the same or similar to the ones found on the float 60. The components are thus referred to using the same reference numerals. In the float 60', the hydraulic cylinder 64 and the line management system 100 are arranged to provide a configuration to the line 90 that is different from the one described with reference to the float 60. In FIG. 7B, the rod 70 is in or near the extended position and the rod pulley 102 is on one side of the redirection pulley 150 and bottom pulley 161. The segments 154, 158 of the rope 92 are generally horizontal. The pitch angles $\alpha$ are smaller than in the float 60 when the rod 72 is in the extended position (FIG. 7A). In FIG. 8B, the rod 70 is in or near the retracted position and the rod pulley 102 is on the other side of the redirection pulley 150 and bottom pulley 161. In other words, the rod pulley 102 is closer to the end 120b when in or near the retracted position, and the rod pulley 102 is closer to the end 120a when in or near the extended position. When the rod 70 is in or near the retracted position, the segments 154, 158 of the rope 92 are generally aligned with the segment 159. The pitch angles $\alpha$ are greater than in the float 60 when the rod 72 is in the retracted position. This arrangement of the hydraulic cylinder 64 and the line management system 100 in the float 60' causes a mechanical advantage to the force applied by the rod 72 when the rod 72 is near or at the retracted position that is more significant than in the float 60. Other arrangements of the hydraulic cylinder 64 and the line management system 100 are contemplated.

Figure 12:
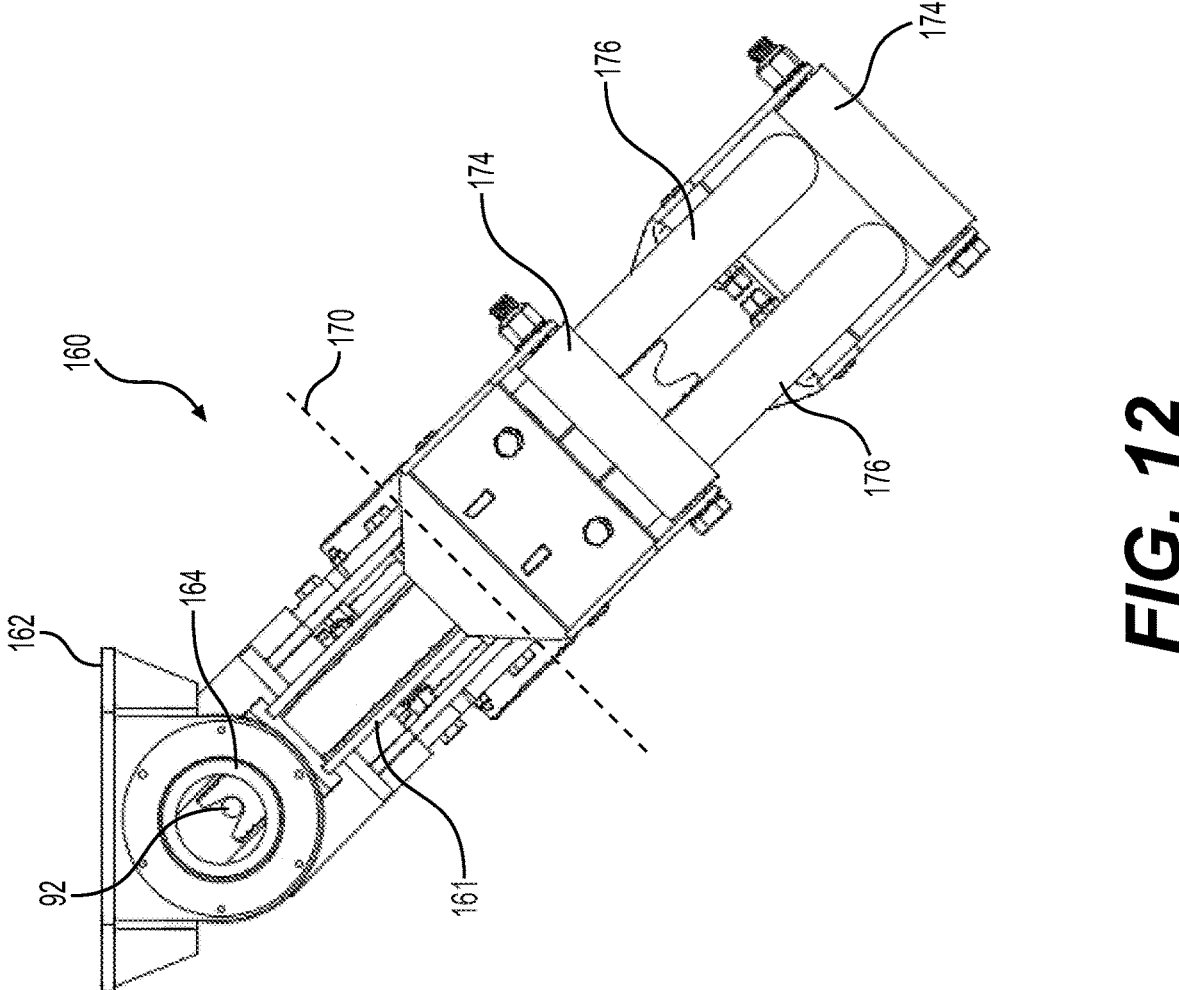
FIG. 12 is a right side elevation view of the bottom pulley assembly of FIG. 11 with a bottom pulley of the bottom pulley assembly being pivoted in a first direction.
Figure 13:
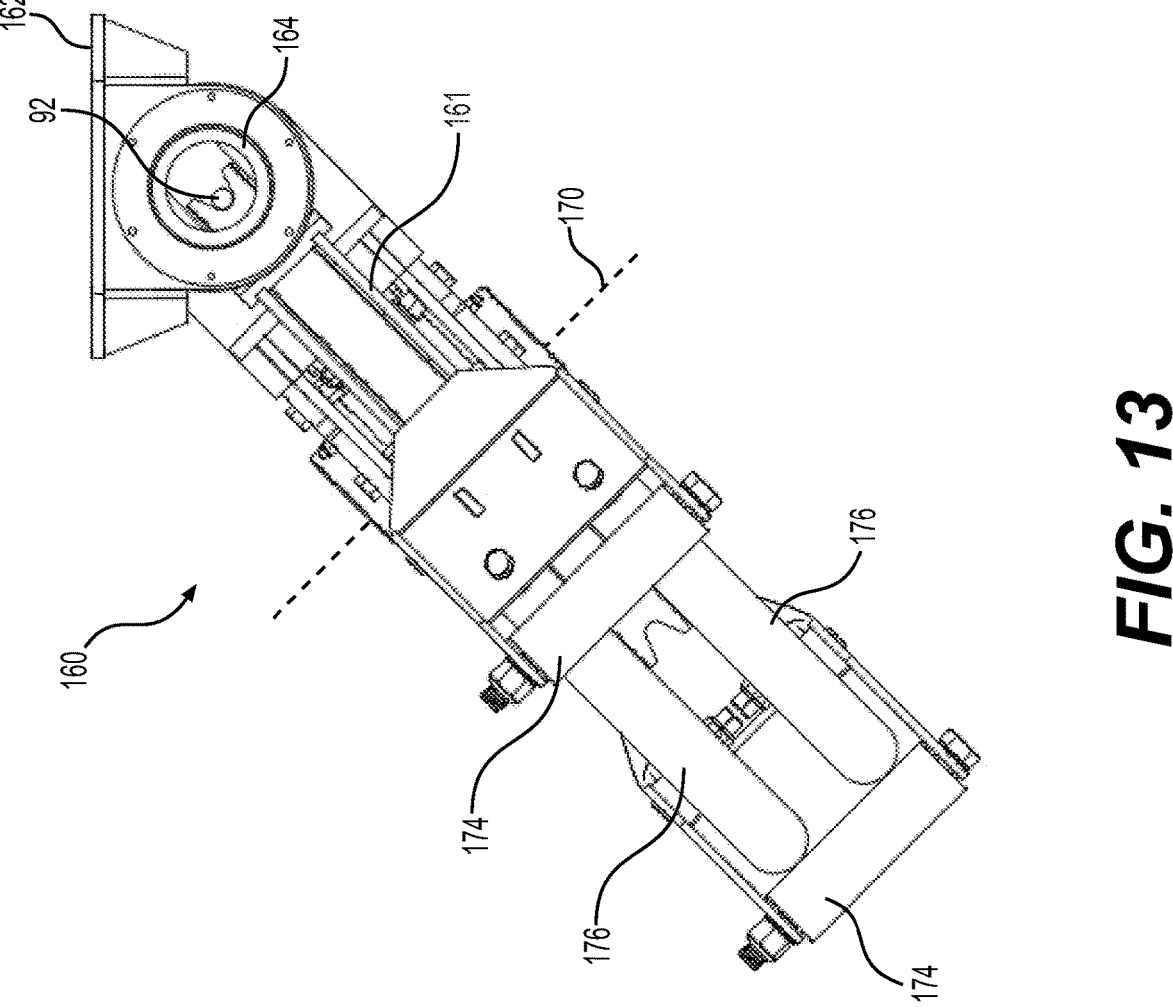
FIG. 13 is a right side elevation view of the bottom pulley assembly of FIG. 11 with the bottom pulley being pivoted in a second direction.

Referring to FIGS. 9 to 13, a bottom pulley assembly 160 which includes the bottom pulley 161 will be described in more detail. The bottom pulley assembly 160 has pillow blocks 162 connected to the frame 140 of the float 60 below the hydraulic cylinder 64. Each of the pillow blocks 162 has a cylindrical portion 162a with a tube 164 received therein. The tubes 164 received inside the cylindrical portions 162a form plain bearings. Each tube 164 is dimensioned for allowing passage of the rope 92 therethrough (FIGS. 12 and 13). It is to be noted that the rope 92 goes through the left tube 164. Passing the rope 92 trough one of the tubes 164 reduces the fleet angle of the rope 92 out of the bottom pulley 161 and assists in maintaining the rope 92 engaged to the bottom pulley 161 when the float 60 is subjected to pitch and/or roll motion caused by the waves. A swivel bracket 166 is connected to the tubes 164 at an upper portion thereof. The swivel bracket 166 rotatably supports the bottom pulley 161, and the bottom pulley 161 is rotatable about a rotation axis 170. The swivel bracket 166 causes the bottom pulley 161 to be pivotable relative to the pillow blocks 162 and the frame 140 of the float 60 about a pivot axis 172 extending through the centers of the tubes 164 and being orthogonal to the rotation axis 170. The pivot axis 172 is represented as a "+" sign in FIGS. 9 and 10. The swivel bracket 166 further includes rollers 174 rotatably connected a lower portion thereof. Guides 176 are also connected to the lower portion of the swivel bracket 166. The guides 176 are orthogonal to the rollers 174. The rollers 174 and the guides 176 assist in directing the bottom pulley 161 to be aligned with the rope 92 and in maintaining engagement of the rope 92 in the bottom pulley 161.

Figure 9:
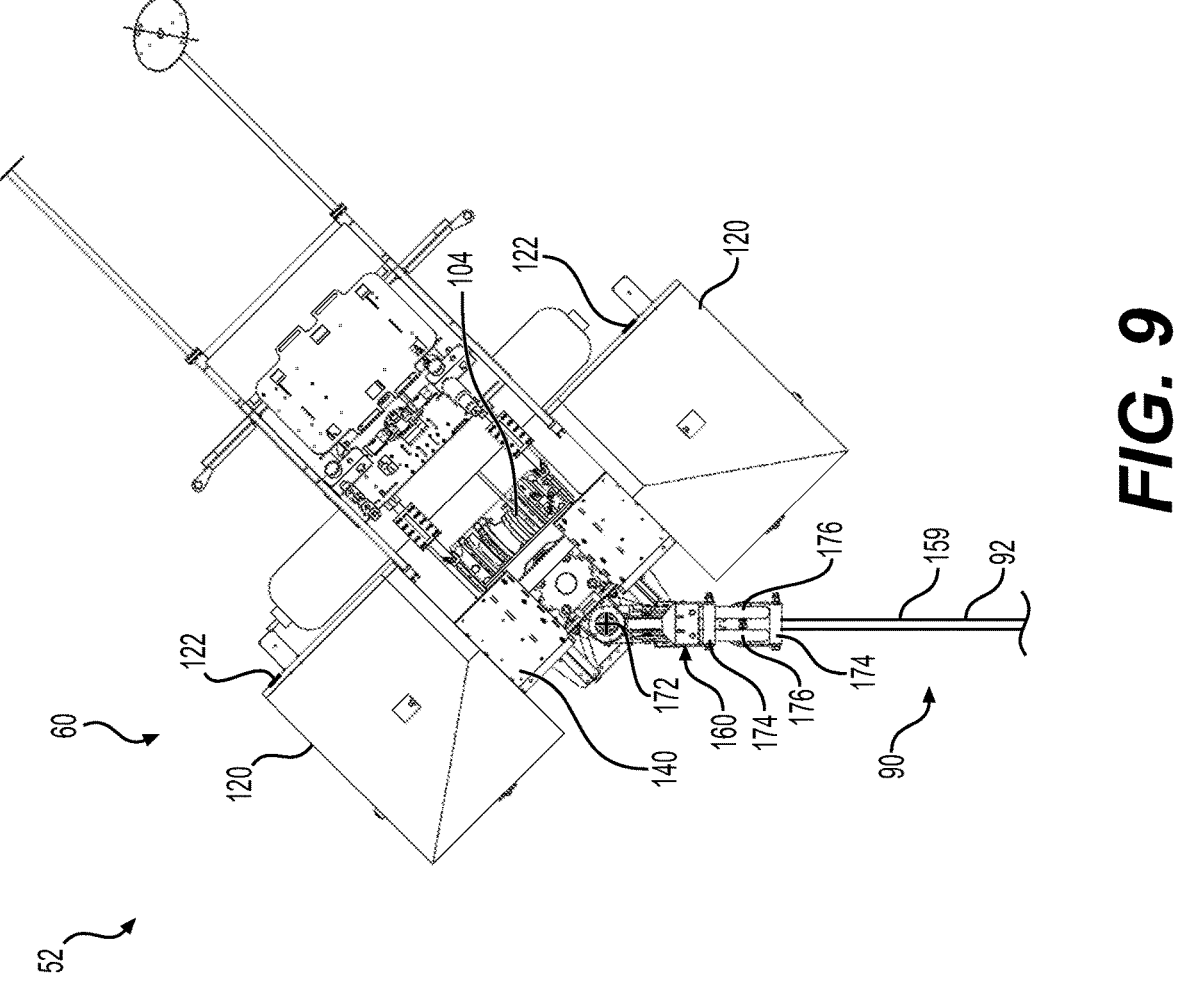
FIG. 9 is a right side elevation view of the portion of the WEC subsystem of FIG. 3 rolling on a wave in a first direction.
Figure 10:
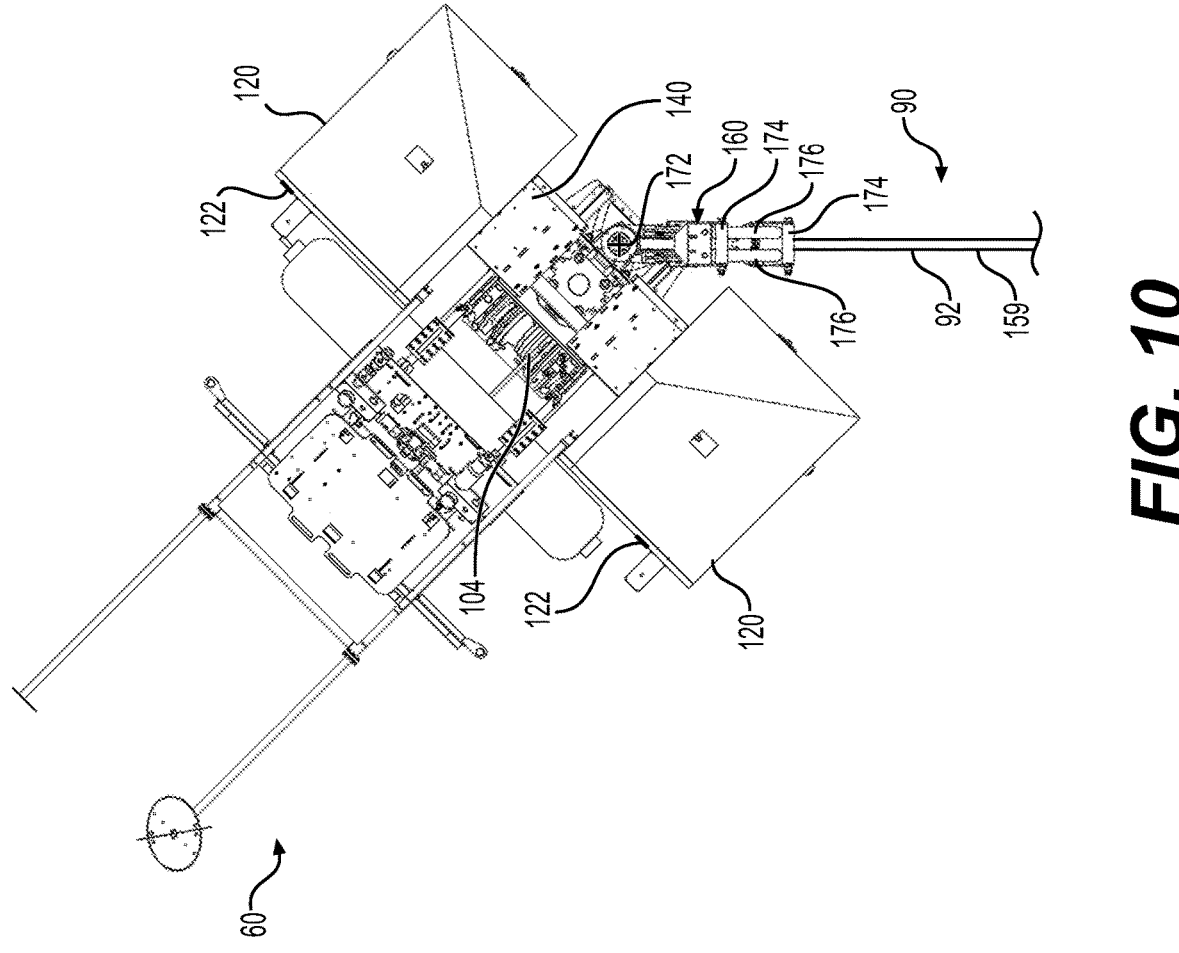
FIG. 10 is a right side elevation view of the portion of the WEC subsystem of FIG. 3 rolling on a wave in a second direction.
Figure 11:
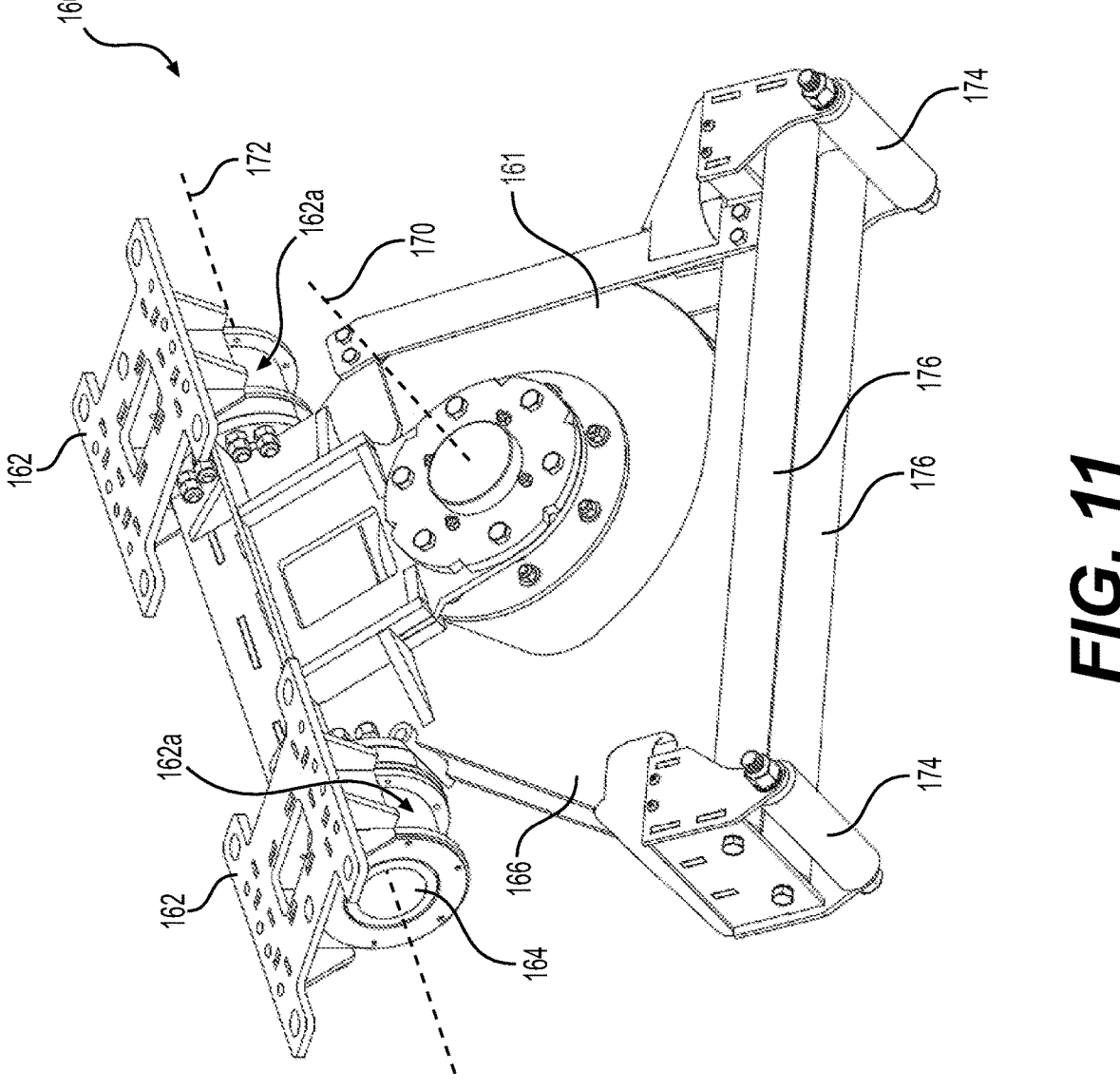
FIG. 11 is a perspective view taken from a top, front, right side of a bottom pulley assembly of the WEC subsystem of FIG. 1.

Referring to FIGS. 9 and 10, when the float 60 is subjected to roll motion caused by the action of the waves, the frame 140 and the pillow blocks 162 roll, but the bottom pulley 161 remains generally vertical upon pivoting about the pivot axis 172. The segment 159 of the rope 92 is thus maintained generally vertical and engaged in the bottom pulley 161 even when the float 60 is subjected to roll motion. Furthermore, the bottom pulley 161 being rotatable about the axis 170 also allows the float 60 to be subjected to pitch motion and maintain the rope 92 engaged in the bottom pulley 161. Therefore, when the float 60 is subjected to pitch motion caused by the action of the waves, the segment 159 is maintained generally vertical between the bottom pulley 161 and the anchor 80.

It is to be appreciated that the bottom pulley 161 redirects the rope 92 with relatively small components, while keeping a radius of curvature sufficient to increase the durability of the rope 92. It is contemplated that, in other embodiments, the radius of the bottom pulley 161 could be larger or smaller than the one shown in the accompanying Figures. Furthermore, having a low inertia pulley (i.e. a bottom pulley 161 that is light and compact) that pivots during the pitch and roll motions of the float 60 conveys less force to the frame 140 compared to a pulley that could not pivot to accommodate roll. Moreover, since the roll of the float 60 is compensated by the bottom pulley 161 pivoting about the pivot axis 172, and the pitch of the float 60 is compensated by the bottom pulley 161 rotating about the axis 170, movement of the rope 92 are better controlled, thus making it possible to use, in some embodiments, a strap or a belt instead of the rope 92.

It is contemplated that using a strap in replacement of the rope 92 could increase the durability of the line 90 between the float 60 and the anchor 80 in wear by bend over sheave, at least in certain conditions.

Figure 14:
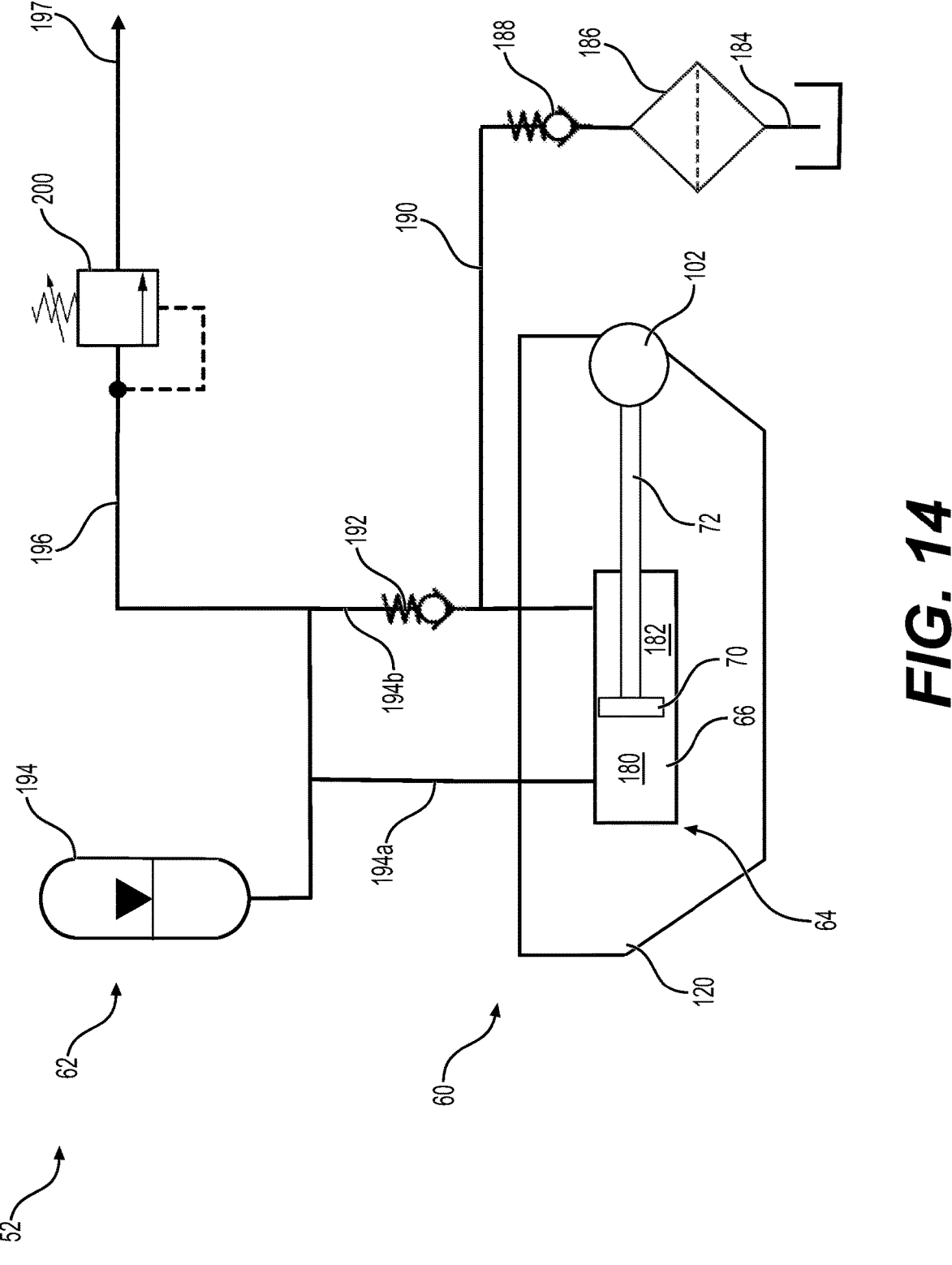
FIG. 14 is a schematic illustration of the hydraulic system of the WEC subsystem of FIG. 1.

Referring now to FIG. 14, the hydraulic system 62 on board the float 60 will be described in more detail. The hydraulic system 62 includes the hydraulic cylinder 64. The hydraulic cylinder 64 is divided into two variable volume chambers 180, 182 by the piston 70, referred herein as the chamber 180 and the chamber 182. A water intake 184 includes a strainer 186 and a one-way valve 188 hydraulically connected downstream the strainer 186. The water intake 184 can be defined by a pipe, a hose or any other element permitting the passage of liquid therethrough. The strainer 186 blocks large and small particles from entering the hydraulic system 62. The one-way valve 188 allows filtered salt water to enter conduit 190 and be directed to the chamber 182.

Another one-way valve 192 is hydraulically connected between the chambers 180, 182. The conduit 190 is hydraulically connected between the chamber 182 and the valve 192. An accumulator 194 is connected to the float 60. The accumulator 194 is initially filled using a pump and contains water and a pressurized gas applying hydrostatic pressure to the water contained in the accumulator 194. It is also contemplated that a compression spring could be used to prime the hydraulic system 62 without the need for a separate pump. It is contemplated that in some embodiments the pressurized gas could be replaced by a spring applying mechanical pressure to the water contained in the accumulator 194. The accumulator 194 is hydraulically connected to the chamber 180 via conduit 194a, and to the chamber 182 via conduit 194b and the one-way valve 192. A pressurized water outlet conduit 196 is hydraulically connected to the conduits 194a, 194b. The pressurized water outlet conduit 196 is hydraulically connected to a pressure regulator 200. The pressure regulator 200 is a back-pressure regulator that allows pressurized salt water to flow toward a water outlet 197 when the pressure of salt water inside the outlet conduit 196 is above a threshold pressure. The pressure regulator 200 ensures that the pressure in the water outlet conduit 196 does not drop and thus assist in preventing that the rod 70 remains stuck in the retracted position. From the water outlet 197, the pressurized salt water flows to the desalination plant 58.

The hydraulic system 62 is operable in two phases corresponding to two strokes of the rod 72 inside the cylinder body 66: during the rise and the fall of the float 60 caused by the action of the waves.

Figure 15:
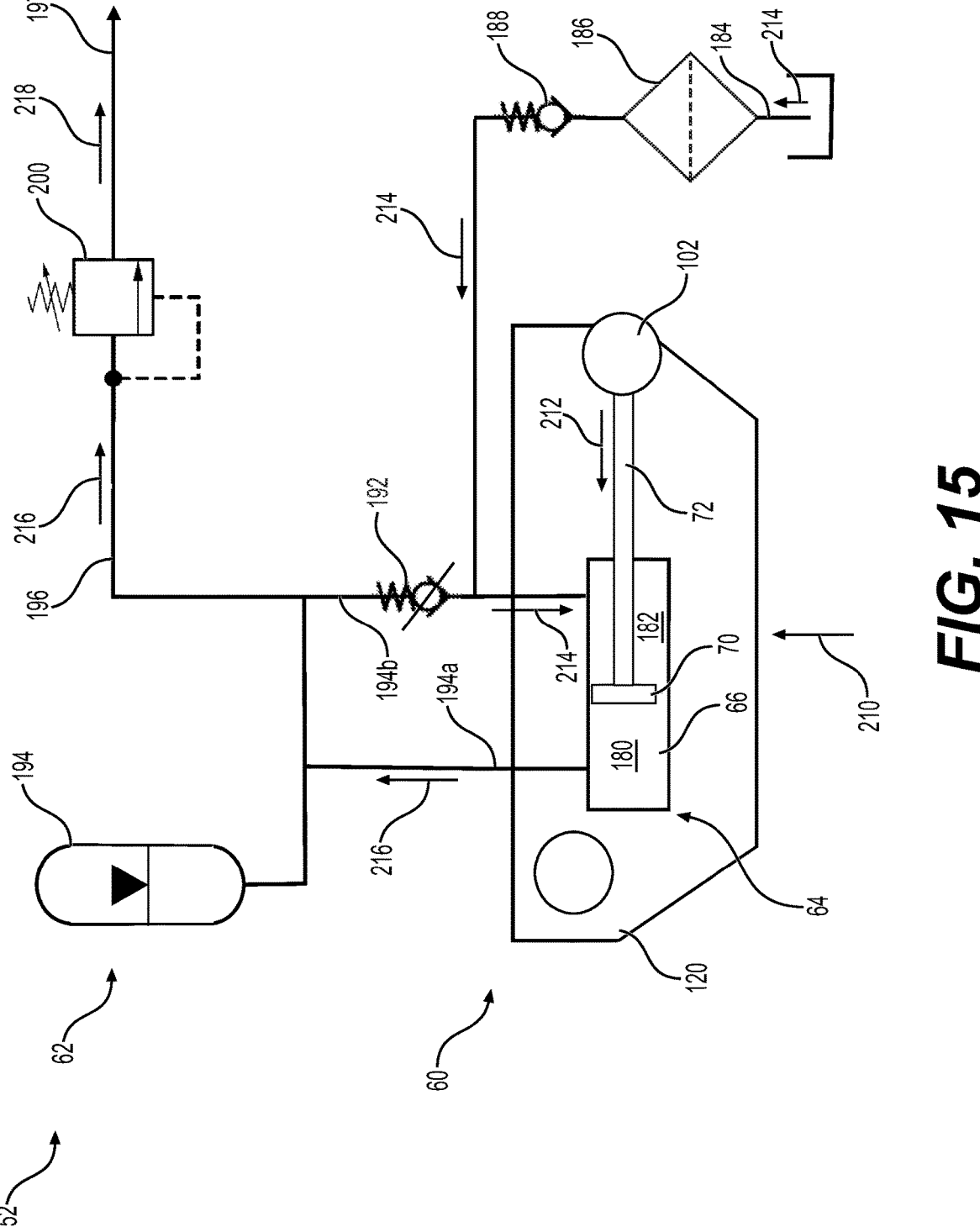
FIG. 15 is a schematic illustration of the hydraulic system of FIG. 14 during an upward stroke.

Referring to FIG. 15, during the rise of the float 60 represented by arrow 210 and since the rope 92 is attached to the anchor 80 and to the winch 104, the rope 92 applies horizontal compression force to the rod 72 via the rod pulley 102. The rod 72 is thus pushed towards the retracted position as represented by arrow 212, causing a depressurization in the chamber 182 of the hydraulic cylinder 64. This depressurization causes the valve 188 to open and salt water to be sucked from the water intake 184, through the strainer 186 and the one-way valve 188, and to the chamber 182 as represented by arrows 214. Pressure rises in the chamber 180, and salt water contained in the chamber 180 and in the conduit 194a is directed towards the accumulator 194 and the water outlet conduit 196 as represented by arrows 216. The resulting pressure rise in the conduit 194b keeps the valve 192 closed. The accumulator 194 fills up with slightly more salt water, and more pressure is applied to the salt water by the pressurized gas contained in the accumulator 194. When a threshold pressure is reached in the water outlet conduit 196, the pressure regulator 200 opens and allows pressurized salt water to flow to the water outlet 197 and toward the desalination plant 58, as represented by arrow 218.

Figure 16:
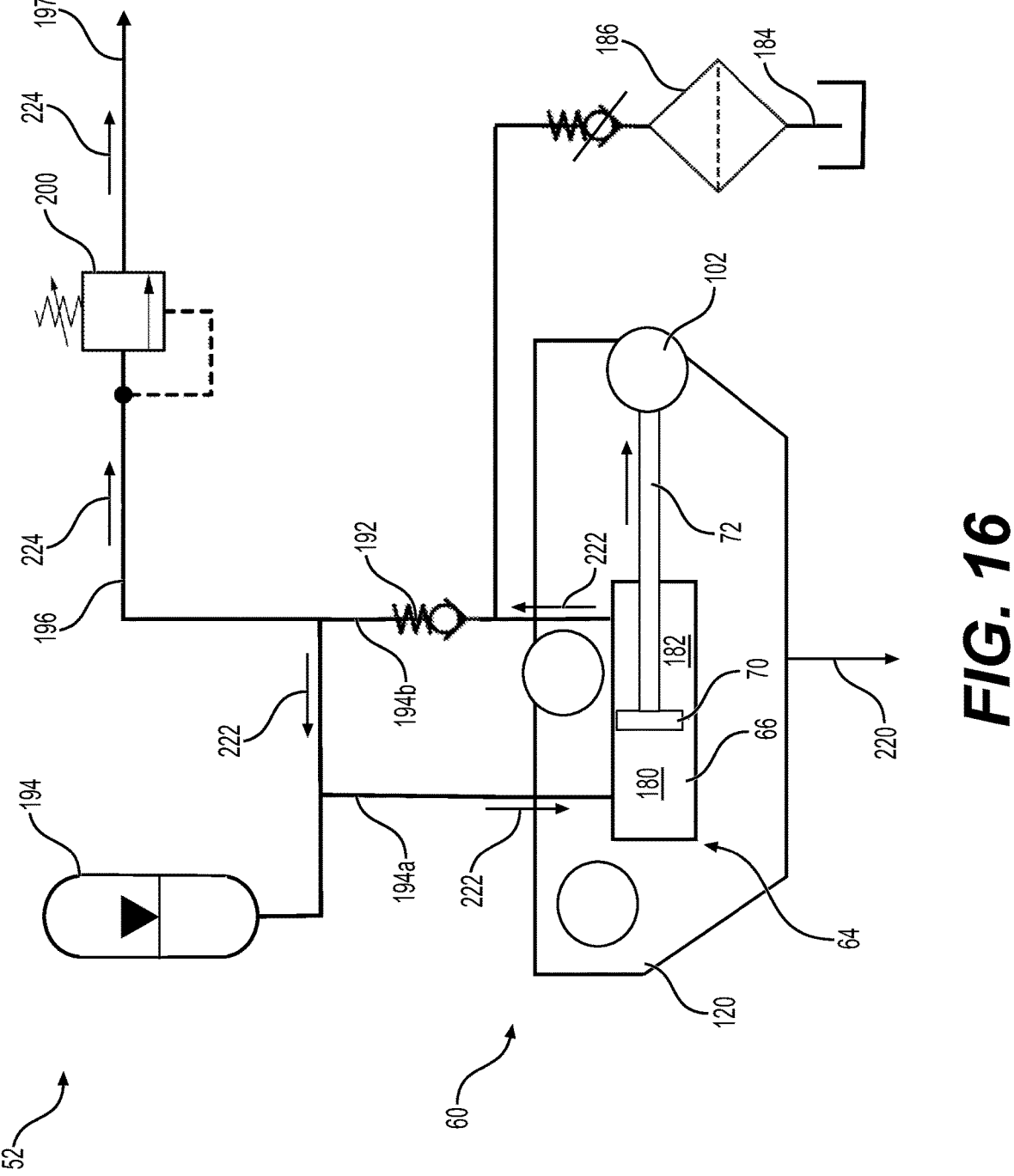
FIG. 16 is a schematic illustration of the hydraulic system of FIG. 14 during a downward stroke.

Referring to FIG. 16, during the fall of the float 60 represented by arrow 220, the wave fades and the tension in the rope 92 decreases. The pressure built up in the chamber 180 pushes the piston 70 towards the extended position, and the rod 72 out of the cylinder body 66. At the same time, pressure in the chamber 182 increases. The one-way valve 188 next to the strainer 186 closes. The one-way valve 192 between the chambers 180, 182 opens. The chamber 182 empties and fills the chamber 180 with salt water flowing through the one-way valve 192 and the conduits 194b, 194a as represented by arrows 222. At this moment, the salt water contained in the chambers 180, 182 is substantially at the same pressure, but since the rod 72 extends in the chamber 182, there is a difference in surface area on both sides of the piston 70 which results in a force being applied to the piston 70 toward the chamber 182, and the rod 72 is forced out of the cylinder body 66 toward the extended position. This helps to push the piston 70 further to the extended position and the rod 72 is further extended out of the cylinder body 66. The resulting motion of the rod pulley 102 toward the extended position also reduces or eliminates slack in the rope 92. At the same time, the accumulator 194 empties slightly of the salt water accumulated therein during the rise of the float 60, causing the rod 72 to be pushed out of the cylinder body 66 even more. When a threshold pressure is reached in the water outlet conduit 196, the pressure regulator 200 opens and allows pressurized salt water to flow to the water outlet 197 and toward the desalination plant 58, as represented by arrows 224. It is to be noted that during the fall of the float 60, no additional salt water is introduced in the hydraulic system 62 via the water intake 184.

It should be noted that one of the advantages of the hydraulic system 62 is to have an adjustment of the return force in relation to the waves. For example, faster waves of greater amplitude will increase the pressure of the salt water contained in the chamber 180 during the rise of the float 60. Since the two chambers 180, 182 are hydraulically connected when the float 60 falls and the valve 192 is open, the pressure in the chamber 182 will also increase. This gives a more responsive return and a float 60 that better follows the waves in certain conditions. Furthermore, it is also contemplated that a remote adjustment of the settings of the pressure regulator 200 is possible if a control of the performance of the hydraulic system 62 in variable weather (i.e. calm sea or storm) is desired.

It is also to be appreciated that, in the present embodiment, wave energy is converted during two sequential phases of the wave period corresponding to the two strokes of the hydraulic cylinder 64 (i.e. during the rise and fall of the float 60 riding the wave). From the hydraulic system 62 of the float 60, the pressurized salt water then flows to the RO desalination subsystem 56 in the desalination plant 58.

Figure 17:
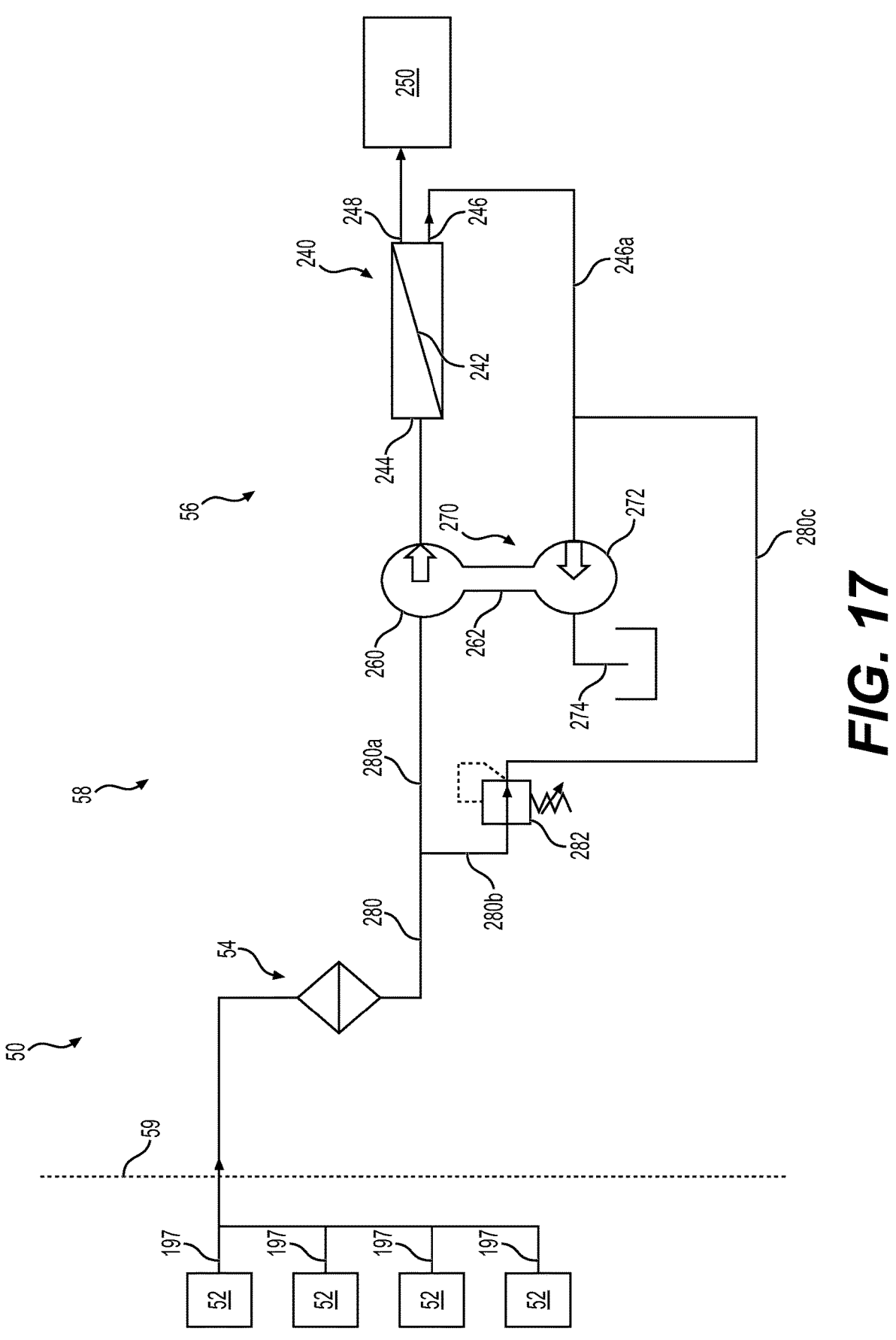
FIG. 17 is a schematic illustration of the desalination plant subsystem of FIG. 1.

Referring to FIG. 17, the water outlet 197 of every WEC subsystems 52 in the system 50 converge to the centralized pretreatment subsystem 54. Although four WEC subsystems 52 are schematically represented in FIG. 17, it is contemplated the that system 50 could include more or less than four WEC subsystems 52 to operate. The pretreatment subsystem 54 includes a filtration subsystem that prevents big and small particles from entering the RO desalination subsystem 56. Other subsystems, such as an ultrafiltration subsystem, could be part of the pretreatment subsystem 54 in other embodiments. Since the pretreatment subsystem 54 is located on the shore in the present embodiment, maintenance operations can be facilitated compared to other systems where the pretreatment subsystem would be located offshore. Once pressurized salt water has passed through the pretreatment subsystem 54, the salt water enters the RO desalination subsystem 56 with a pressure that is contemplated to range between about 150 to 300 pounds per square inch (PSI). Other pressures are contemplated.

Referring to FIG. 17, the RO desalination subsystem 56 will be generally described. The RO desalination subsystem 56 produces fresh water, referred to herein a permeate. The RO desalination subsystem 56 has a RO cell 240 containing RO membranes 242 (schematically shown in FIG. 17). It is contemplated that multiple RO cells 240 could be used and that each RO cell 240 could contain more than one RO membrane 242. The RO cell 240 has three ports: a water intake port 244, a brine exhaust port 246 and a permeate exhaust port 248. In order to have satisfactory conversation rate of desalinated water, the pressure of the salt water flowing through the water intake port 244 has to be increased to about 500 to 900 PSI using a hydraulic pump 260. It is contemplated that the pressure of the salt water flowing through the water intake port 244 could be different depending on the type of RO cell 240 used. A hydraulic motor 272 powers the hydraulic pump 260 in order to increase the pressure to about 500 to 900 PSI. The hydraulic motor 272 and the hydraulic pump 260 define an energy recovery pumping device 270. The hydraulic pump 260 is mechanically connected by a transmission shaft 262 to the hydraulic motor 272 in order to transmit power from the hydraulic motor 272 to the hydraulic pump 260. Other types of hydraulic pumps 260 are contemplated.

When entering the RO cell 240 with sufficient pressure, the salt water is separated into permeate and brine inside the RO cell 240 by the RO membrane 242. The permeate exits the RO cell 240 by the permeate exhaust port 248 and flows to a reservoir 250 where it is used or stored. The brine exits the RO cell 240 by the brine exhaust port 246 and flows to the energy recovery pumping device 270. The energy lost in the pressurized brine is consequently important because this energy corresponds to brine flow multiplied by pressure. There is a low pressure drop along the RO cell 240 so the energy loss from pressurized brine waste is more significant than the energy to desalinate the water. In order to recover at least some of that energy, the flow of brine goes through conduit 246a and to the hydraulic motor 272 of the energy recovery pumping device 270 and runs the hydraulic pump 260. From the energy recovery pumping device 270, the brine is sent to a discharge 274 (i.e. returned to the sea). It is contemplated that the brine could be used to wash the strainer 186 before being discharged.

Moreover, the present technology enables to use the pressurized salt water that has passed through the pretreatment system 54 to assist in starting the hydraulic motor 272 of the energy recovery pumping device 270 that is then capable of sustaining the RO desalination process. Referring to FIG. 17, the RO desalination subsystem 56 has a conduit 280 flowing downstream the pretreatment subsystem 54 that splits into conduits 280a, 280b. The conduit 280a is hydraulically connected to the hydraulic pump 260 of the energy recovery pumping device 270. The conduit 280b connects to a by-pass valve 282 that is hydraulically connected to the hydraulic motor 272 by a conduit 280c that permits redirecting pressurized salt water toward the hydraulic motor 272 of the energy recovery pumping device 270.

At start-up of the RO desalination subsystem 56, the by-pass valve 282 is opened and pressurized salt water flowing from the WEC subsystem 52 flows through the conduits 280*b*, 280*c*. As pressurized water enters the hydraulic motor 272, the hydraulic motor 272 is driven and water flows out of the hydraulic motor 272 with reduced pressure to the discharge 274. As the hydraulic motor 272 continues to be driven by the pressurized water, the hydraulic pump 260 is driven and increases the pressure of the salt water flowing through the conduit 280*a* to a higher pressure suitable for the RO desalination process to occur efficiently inside the RO cell 240. As brine flows out of the RO cell 240, brine is returned towards the hydraulic motor 272 via conduit 246*a*. In response to the brine supplied by the RO cell 240 to the hydraulic motor 272 via conduit 246*a* being below a predetermined pressure, the by-pass valve 282 remains open to supply pressurized salt water to the hydraulic motor 272.

In response to the brine supplied by the RO cell 240 to the hydraulic motor 272 via conduit 246*a* being above the predetermined pressure, the by-pass valve 282 is closed and pressurized salt water flowing from the WEC subsystem 52 flows through the conduits 280, 280*a* so as to be supplied to the hydraulic pump 260 being sufficiently driven by the hydraulic motor 272 to provide pressurized salt water to the water intake port 244 of the RO cell 240. The pressure of the brine flowing through the brine exhaust port 246 and in conduit 246*a* is then sufficient to drive the hydraulic motor 272 without the need for pressurized salt water flowing through conduit 280*c*. The RO desalination subsystem 56 can thus operates at steady-state.

The present technology thus enables the RO desalination subsystem 56 to be started without the use of an electric motor that would drive the hydraulic motor 272. Furthermore, even if the RO desalination subsystem 56 were equipped with an electric motor operatively connected to the hydraulic motor 272, the present technology would provide reduced power consumption at start-up because of the use of the pressurized salt water flowing through the conduit 280*c*.

Figure 18:
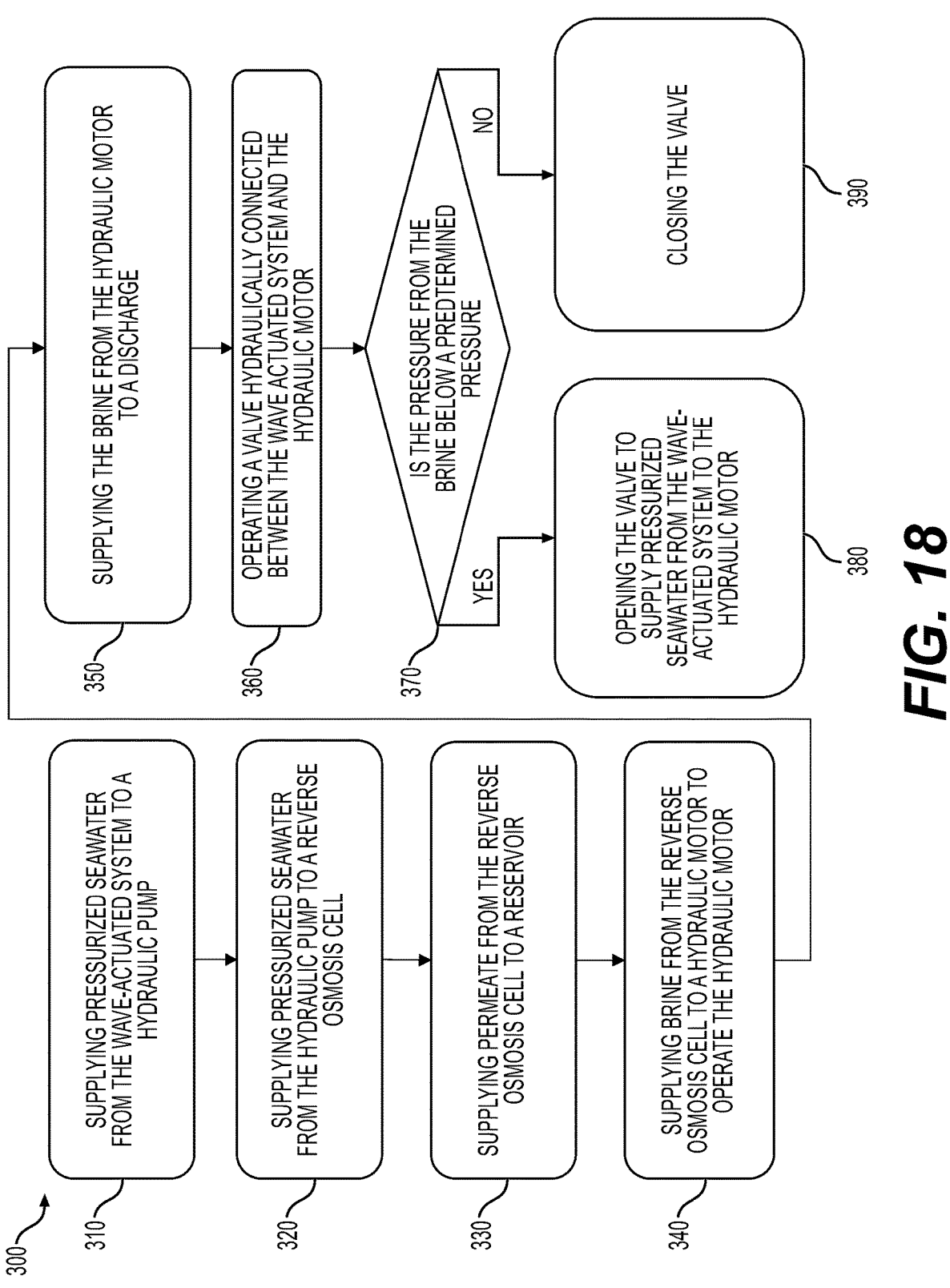
FIG. 18 is a flowchart of a method for operating a reverse-osmosis desalination subsystem using pressurized salt water supplied by a wave-actuated system.

Referring to FIG. 18, there is thus provided a method 300 for operating the reverse-osmosis desalination subsystem 56 using pressurized salt water supplied by the wave-actuated subsystem 52. At step 310, the method 300 includes supplying pressurized salt water from the wave-actuated subsystem 52 to the hydraulic pump 260. The step 310 is performed using the conduits 280, 280*a* (FIG. 17). At step 320, the method 300 includes supplying the pressurized salt water from the hydraulic pump 260 to the RO cell 240. Step 330 includes supplying the permeate from the RO cell 240 to the reservoir 250 (FIG. 17). Step 340 includes supplying the brine from the RO cell 240 to the hydraulic motor 272 to operate the hydraulic motor 272. The step 340 is performed using the conduit 246*a* (FIG. 17). Step 350 includes supplying the brine from the hydraulic motor 272 to the discharge 274. At step 360, the method 300 includes operating the by-pass valve 282 hydraulically connected between the wave-actuated subsystem 52 and the hydraulic motor 272 along the conduit 280*b*. At step 370, pressure from the brine supplied by the RO cell 240 is measured. If the pressure from the brine is below a predetermined pressure, the by-pass valve 282 is opened at step 380 to supply pressurized salt water to the hydraulic motor 272. Conversely, if the pressure from the brine is above the predetermined pressure, the by-pass valve 282 is closed at step 390.

Figure 19:
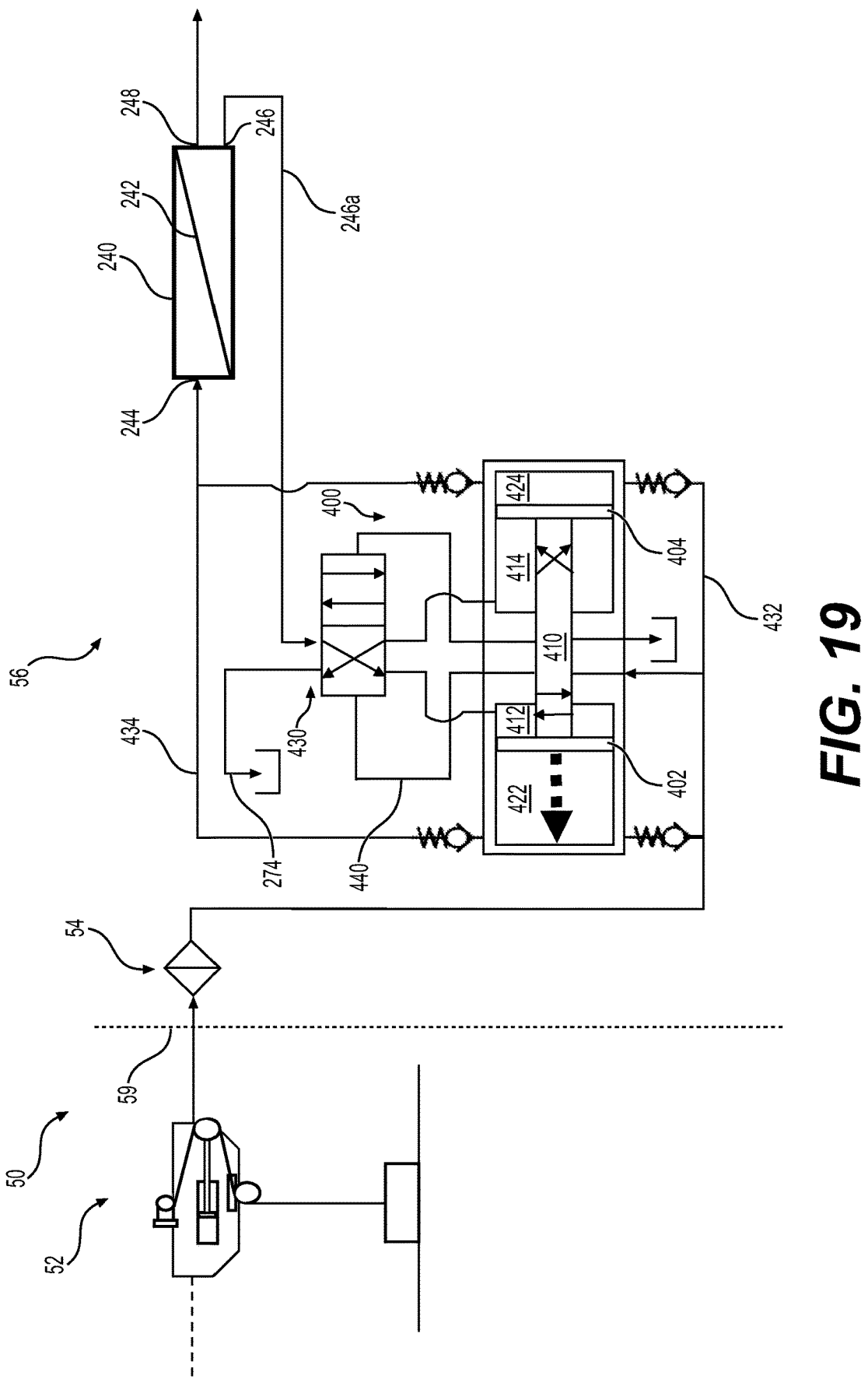
FIG. 19 is a schematic illustration of the system of FIG. 1, with the desalination plant including a piston pump having the piston moving to the left.
Figure 20:
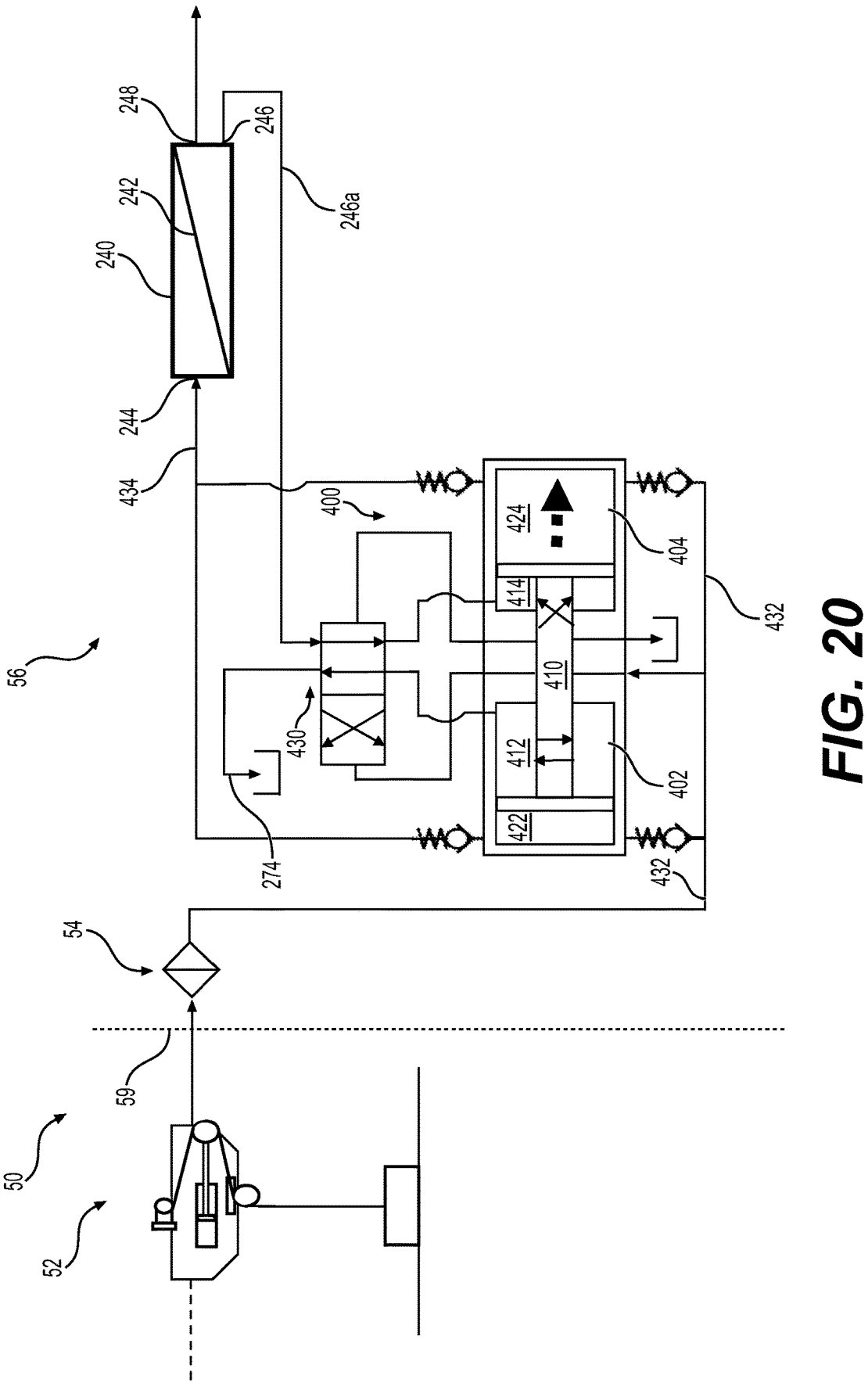
FIG. 20 is a schematic illustration of the system of FIG. 19, with the piston moving to the right.

Referring now to FIGS. 19 and 20, an illustrative scenario of the present technology will be described with reference to a piston pump 400 being the energy recovery pumping device 270. The piston pump 400 is a positive displacement pump with two pistons 402, 404 connected by a rod 410. Inner chambers 412, 414 alternately suck brine from the RO cell 240 and expel the brine to the discharge 274. Outer chambers 422, 424 alternately suck salt water from the pretreatment subsystem 54 and expel salt water to the RO cell 240. Alternating operation is performed using a spool valve 430.

The volume of the chambers 412, 414, 422, 424 depends on the position of pistons 402, 404 and the rod 410. For example, when the piston 402 is moved all the way to the left with reference to FIG. 19, the volume of inner chamber 412 is greater than the volume of the outer chamber 422, and the volume of outer chamber 424 is greater than the volume of the inner chamber 414. When the piston 402 is moved all the way to the right with reference to FIG. 19, the volume of inner chamber 412 is smaller than the volume of the outer chamber 422, and the volume of outer chamber 424 is smaller than the volume of the inner chamber 414. It should be noted that the difference in maximum volume between the inner chambers 412, 414 and outer chambers 422, 424 is dictated by the diameter of the rod 410 and this diameter is carefully selected. For example, if the rod 410 occupies 25% of the volume of the inner chambers 412, 414, these chambers 412, 414 have a volume equivalent to 75% of the volume of the outer chambers 422, 424. This means that the piston pump 400 can accommodate a brine flow rate equivalent to 75% of the flow supplied at the water intake port 244 of the RO cell 240 passing through the outer chambers 422, 424. The remaining 25% of the flow is discharged through the RO cell 240 in the form of permeate. The RO cell 240 conversion rate (i.e. recovery rate) is therefore determined by the geometry of the components of the piston pump 400.

In FIG. 19, the rod 410 is moving to the left. The outer chamber 424 sucks the pressurized salt water arriving from the WEC subsystem 52 and pretreatment subsystem 54 via the conduit 432. The outer chamber 422 sends high pressure pressurized salt water to the water intake port 244 of the RO cell 240 via conduit 434. The inner chamber 412 receives the brine exiting the RO cell 240 via the conduit 246*a*, which facilitates the movement of the rod 410 and applies a force to the salt water contained in the outer chamber 422. The inner chamber 414 drains the brine from the previous cycle through the spool valve 430 and supplies it to the discharge 274.

When the rod 410 reaches the end of its stroke (i.e. the piston 402 is moved all the way to the left with reference to FIG. 19), a small portion of the pressurized salt water arriving from the WEC subsystem 52 and the pretreatment subsystem 54 can pass through the rod 410 and push on the spool valve 430 to make it change position via circuit 440. When the spool valve 430 changes position, the role of the chambers 412, 422 and that of the chambers 414, 424 is reversed as shown in FIG. 20.

In FIG. 20, the rod 410 is moving to the right. The outer chamber 422 sucks the pressurized salt water arriving from the WEC subsystem 52 and pretreatment subsystem 54 via the conduit 432. The outer chamber 424 sends high pressure pressurized salt water to the water intake port 244 of the RO cell 240 via conduit 434. The inner chamber 414 receives the brine exiting the RO cell 240 via the conduit 246*a*, which facilitates the movement of the rod 410 and applies a force to the salt water contained in the outer chamber 424. The inner chamber 412 drains the brine from the previous cycle through the spool valve 430 and supplies it to the discharge 274. It is contemplated that the brine could be used to wash the strainer 186 before being discharged.

At the end of the stroke of the rod 410 (i.e. the piston 404 is moved all the way to the right with reference to FIG. 20), the pressurized salt water arriving from the WEC subsystem 52 and the pretreatment subsystem 54 can pass through the rod 410 again and change the position of the spool valve 430 and the cycle continues.

Figures 21A, 21B:
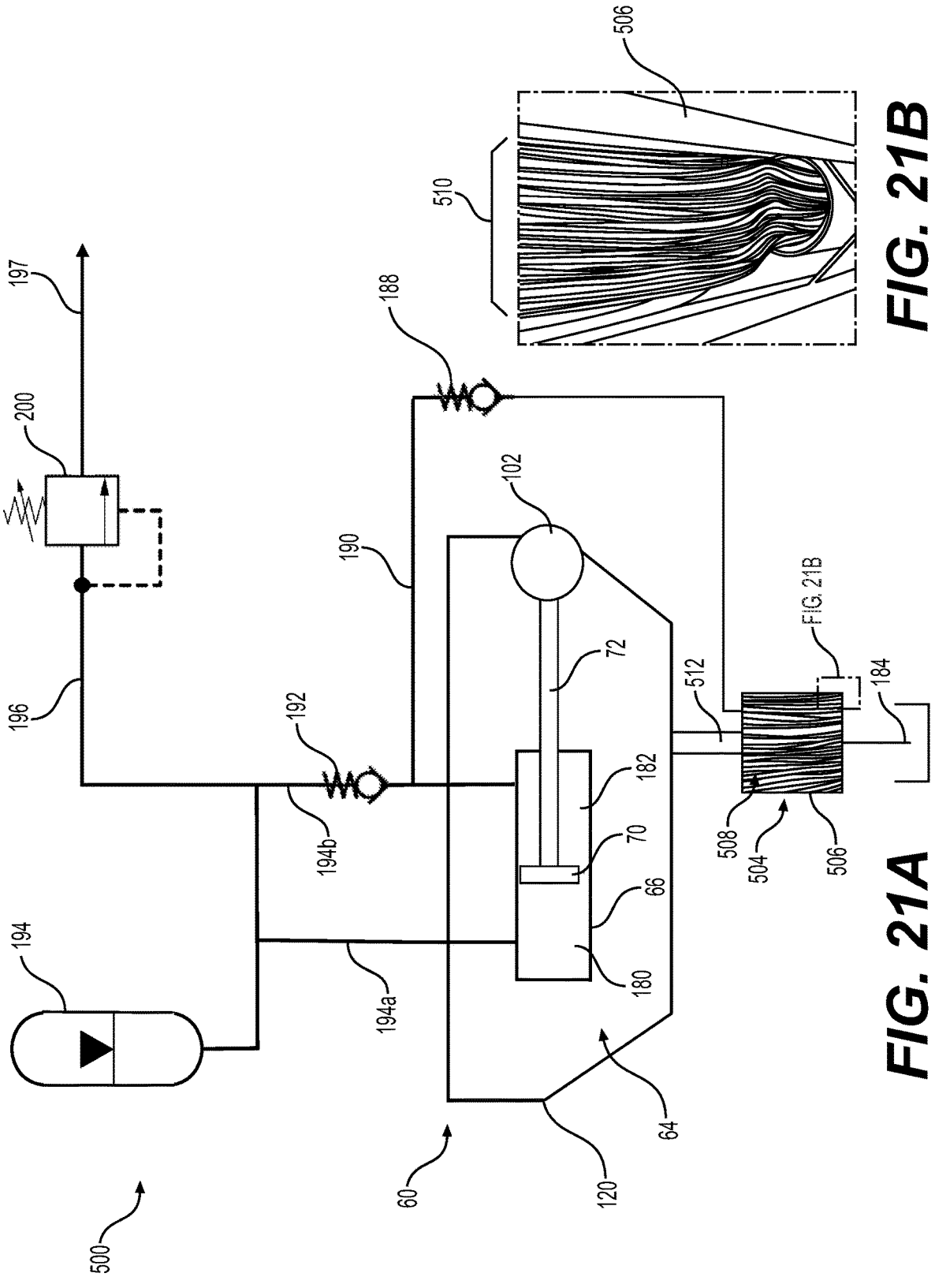
FIG. 21A is a schematic illustration of an alternative embodiment of the hydraulic system of FIG. 14.
FIG. 21B is a close-up view of an ultrafiltration device of the system of FIG. 21B.
Figure 22:
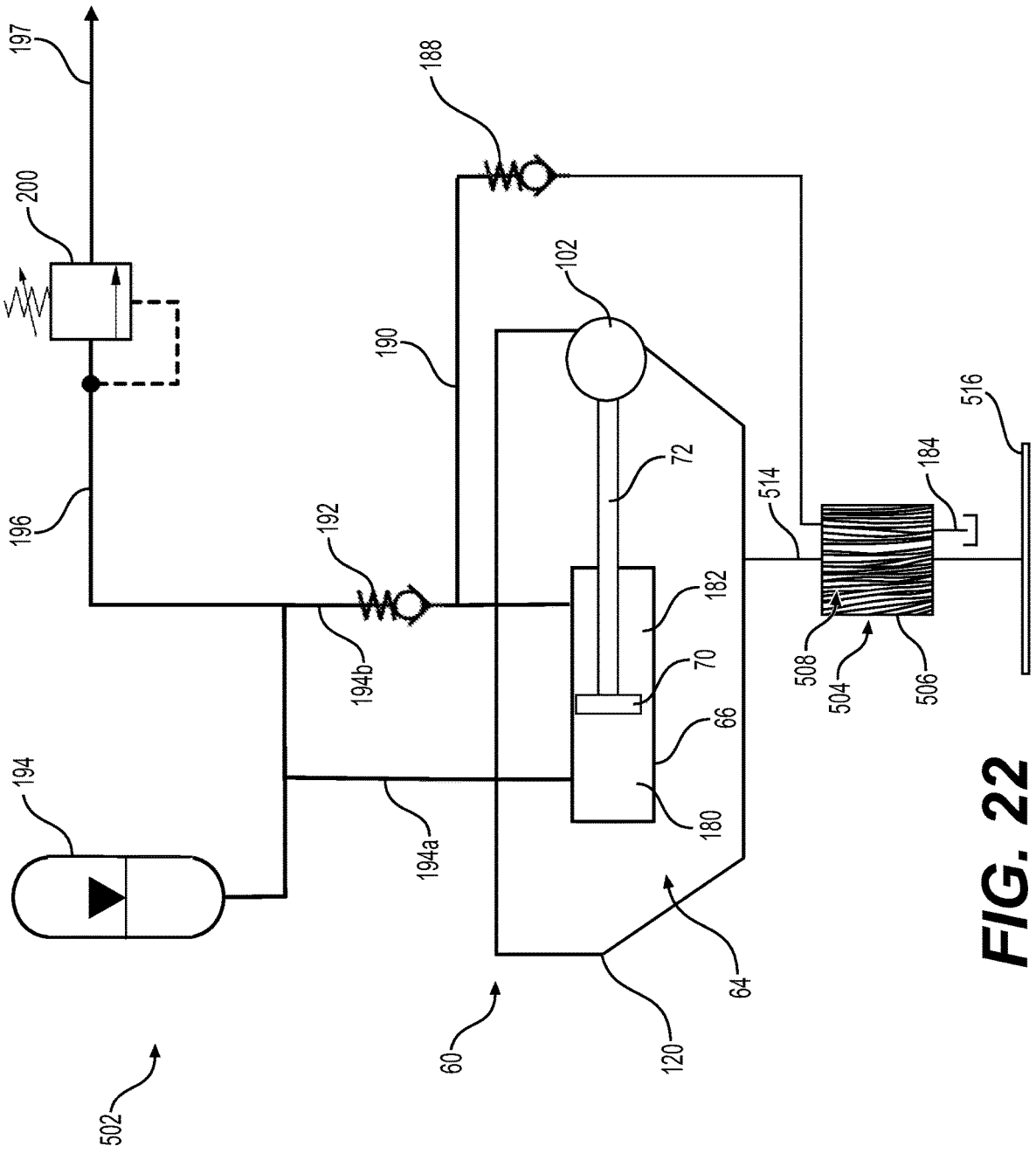
FIG. 22 is a schematic illustration of another alternative embodiment of the hydraulic system of FIG. 14.

Turning now to FIGS. 21A to 22, hydraulic systems 500 and 502, which are alternative embodiments of the hydraulic system 62 of FIG. 14, will be described. Components of the hydraulic systems 500, 502 that are the same or similar to those of the of the hydraulic system 62 have been labeled with the same reference numerals and will not be described again.

With reference to FIGS. 21A and 21B, in the hydraulic system 500, the strainer 186 has been replaced by an ultrafiltration device 504. It is contemplated that as a result of using the ultrafiltration device 504, the pretreatment subsystem 54 described above could be omitted. The ultrafiltration device 504 has a housing 506 inside which ultrafiltration membranes 508 are disposed. In the present embodiment, the ultrafiltration membranes 508 are hollow fiber ultrafiltration (HFUF) membranes 508. The HFUF membranes 508 are made up of a plurality of flexible hollow fibers 510. Each fiber 510 has a plurality of small pores (not shown as they are too small to see) having a diameter of about 0.02 microns through which water enters the hollow fibers 510. Pores of a different diameter are contemplated. Other types of ultrafiltration membranes 508 are also contemplated.

The ultrafiltration device 504 is suspended from the float 60 so as to be submerged in water during use. The ultrafiltration device 504 is connected to the float with a rigid member 512 such as, for example, a rod or beam made from plastic or stainless steel. A line (not shown) from a winch (not shown) provided on the float 60 is connected to the ultrafiltration device 504 to raise the ultrafiltration device 504 out of the water. In response to the float 60 moving up and down with the waves, the ultrafiltration device 504 also moves up and down in the water. As a result of the up and down movement of the ultrafiltration device 504 in the water, the ultrafiltration membranes 508 rub against each other thereby cleaning the ultrafiltration membranes 508. In the present embodiment, the fibers 510 rub against each other and the friction between the fibers 510 and with the salt water cleans the fibers 510. This motion of the ultrafiltration device 504 also helps to prevent the attachment of impurities and micro-organisms to the surface of the ultrafiltration membranes 508. By causing this motion of the ultrafiltration device 504, there is no need for bubbling systems, backwashing systems and/or chemical product injection systems typically used for cleaning ultrafiltration devices that are kept static in water tanks. It is contemplated that buoyant material, such as closed-cell foam for example, could be added to the ultrafiltration device 504 to reduce the load on the rigid member 212.

In the hydraulic system 502, the rigid member 512 has been replaced by a line 514 that connects the ultrafiltration device 504 to the float 60. It is contemplated that the line 514 could be a rope, a chain, a strap, a cable, a belt or a tether for example. A drag plate 516 is connected to the ultrafiltration device 504. It is contemplated that the drag plate 516 could be omitted or replaced by a weight.

It is contemplated that an ultrafiltration device assembly including the float 60 (or another type of float) and the ultrafiltration device 504 connected thereto could be used off-shore to supply filtered water in applications other than reverse osmosis.

Turning now to FIGS. 23 to 30, desalination subsystems 600, 602, 604, 606 and 608 which are alternative embodiments of the desalination subsystem 56 of FIG. 19, will be described. Components of the desalination subsystems 600, 602, 604, 606 and 608 that are the same or similar to those of the of the desalination subsystem 56 have been labeled with the same reference numerals and will not be described again. Also, components of the desalination subsystems 600, 602, 604, 606 and 608 that are the same or similar have been labeled with the same reference numerals and will be described only once.

In the desalination subsystems 600, 602, 604, 606 and 608, a flush valve 610 is hydraulically connected the brine exhaust port 246 of the RO cell 240 to selectively fluidly communicate the brine exhaust port 246 with the discharge via a conduit 612.

When the flush valve 610 is closed, the desalination subsystems 600, 602, 604, 606 and 608 operate in a permeate production mode where salt water is supplied is the water intake port 244 of the RO cell above the osmotic pressure of the salt water, permeate is supplied from the permeate exhaust port 248 to the reservoir 250, and brine is supplied from the brine exhaust port 246 to the discharge 274 via a conduit 614. It is contemplated that the brine could be used to wash the strainer 186 before being discharged.

When the flush valve 610 is opened, the desalination subsystems 600, 602, 604, 606 and 608 operate in a flushing mode where the RO membranes 242 are cleaned. In the flushing mode particles, scaling and/or bacterial growth that may have accumulated on the RO membranes 242 are at least partially removed from the RO membranes 242 and are flushed out of the RO cell 240 via the brine exhaust port 246. In response to the flush valve 610 being opened, the pressure of the brine flowing out of the brine exhaust port and, as a result, the pressure of the salt water supplied to the water intake port 244 are reduced. Once the pressure of the salt water being supplied to the water intake port 244 falls below the osmotic pressure of the salt water, permeate production is interrupted. This reduction in pressure below the osmotic pressure of the salt water causes permeate that has been produced by the RO cell 240, and which is in the reservoir 250, to flow back toward the RO cell 240 and through the RO membranes 242 to the brine side of the RO cell 240. As it passes through the RO membranes 242, the permeate dislodges particles, scaling and/or bacterial growth that may have accumulated on the RO membranes 242. The reduction in pressure of the salt water supplied to the water intake port 244 increases the flow rate of the salt water supplied to the water intake port 244 and therefore the flow rate of water in the RO cell 240 from the water intake port 244 to the brine exhaust port 246. The increased flow rate of water also helps dislodge particles, scaling and/or bacterial growth that may have accumulated on the RO membranes 242 and carries the dislodged particles, scaling and/or bacterial growth to the brine exhaust port 246.

The flush valve 610 is opened intermittently to switch from the permeate production mode to the flushing mode. This could be when cleaning of the RO membranes 242 is needed or at regular intervals.

With reference to FIG. 23, in the desalination subsystem 600, the flush valve 610 is hydraulically connected between the brine exhaust port 246 and the spool valve 430.

With reference to FIG. 24, in the desalination subsystem 602, a pump 616 is provided. Salt water is supplied to the pump 616 by the WEC subsystem 52 (not shown in FIG. 24). It is contemplated that the pump 616 could be a hydraulic pump, such as the hydraulic pump 260 of the energy recovery pumping device 270 described above, or the piston pump 400, or another type of pump. The pump 616 supplies salt water to the water intake port 244 of the RO cell 210. An accumulator 618 is fluidly connected between the pump 616 and the water intake port 244. The accumulator 618 is similar to the accumulator 194 described above. In the permeate production mode, the accumulator 618 accumulates some of the salt water supplied by the pump 616. In the flushing mode, in response to the flush valve 610 being open, salt water from the accumulator 618 is supplied to the water intake port 244 to further increase the flow rate of salt water supplied to the water intake port 244. It is contemplated that the accumulator 618 could be omitted. A discharge valve 620 is hydraulically connected between the brine exhaust port 246 and the conduit 614. The degree of opening of the discharge valve 620 is set for constricting a flow of brine to the conduit 614 such that the pressure of the salt water supplied to the water intake port 244 is above the osmotic pressure of the salt water when the flush valve 610 is closed. A discharge valve 622 is hydraulically connected between the brine exhaust port 246 and the conduit 612. In the present embodiment, the discharge valve 622 is disposed downstream of the flush valve 610, but it is contemplated that the discharge valve 622 could be disposed upstream of the flush valve 610. The discharge valve 622 regulates a flow of water to the conduit 612. A flow rate of water through the discharge valve 622 is greater than a flow rate of water through the discharge valve 620.

With reference to FIG. 25, in the desalination subsystem 604, a pressure exchanger 624 is provided. One side 626 of the pressure exchanger 624 is hydraulically connected to the brine exhaust port 246 to receive pressurized brine when the flush valve 610 is closed. From the side 626 of the pressure exchanger 624, brine is supplied by the conduit 614 to the discharge 274. Another side 628 of the pressure exchanger 624 is supplied by a portion of the salt water supplied by the WEC subsystem 52, which by-passes the pump 616. The pressure of the salt water passing through the side 628 of the pressure exchanger 624 is increased by the pressure exchanger 624 by using the pressurized brine passing through the side 626 of the pressure exchanger 624. From the side 628 of the pressure exchanger 624, the salt water is supplied to the water intake port 244. The flush valve 610 is connected to the brine exhaust port 246 upstream of the side 626 of the pressure exchanger 624.

With reference to FIG. 26, in the desalination subsystem 606, a mechanical flush valve actuator 630 is provided to intermittently open the flush valve 610. With reference to FIG. 27, in one embodiment of the flush valve 610, a valve member 632 is driven by a shaft 634. The valve member 632 is disposed inside a valve housing 636. The valve housing 636 has a valve inlet 638 for receiving water from the brine exhaust port 246 and a valve outlet 640 for supplying water to the conduit 612. In FIG. 27, the valve member 632 is shown in a position corresponding to a fully opened position of the flush valve 610. As the shaft 634 turns, the valve member 632 blocks the flow of water through the valve inlet 638 and/or the valve outlet 640, thereby closing the flush valve 610. The speed at which the shaft 634 rotates the valve member 632 determines how much time the flush valve 10 spends closed versus opened. Other types of flush valves are contemplated. The mechanical flush valve actuator 630 is mechanically connected to the piston pump 400. With reference to FIG. 28, in the present embodiment, the flush valve actuator 630 includes a connecting rod 642, a coupling rod 644, a drive gear 646 and a driven gear 648. The connecting rod 642 is connected to one of the piston 402, the piston 404 and the rod 410 of the piston pump 400 such that reciprocation of the one of the piston 402, the piston 404 and the rod 410 causes the connecting rod 642 to reciprocate. The coupling rod 644 is pivotally connected to the end of the connecting rod 642 and rotationally connected to the drive gear 646 at a position offset from a center of the drive gear 646. As the connecting rod 642 reciprocates, the coupling rod 644 turns the drive gear 646. The drive gear 646 engages and drives the driven gear 648. The driven gear 648 is connected to and drives the shaft 634. As such, rotation of the driven gear 648 rotates the valve member 632 of the flush valve 610. As such, the gear ratio of the gears 646, 648 determines the frequency at which the flush valve 610 is open. In some embodiments, the gear ratio is selected such that the flush valve 610 is open at every X cycles of the piston pump 400, where X is range from 10 to 1000. Other types of mechanical flush valve actuators are contemplated. For example, the gears 646, 648 could be replaced by two pulleys and a belt.

With reference to FIG. 29, in the desalination subsystem 608, a hydraulic flush valve actuator 650 is provided to intermittently open the flush valve 610. The hydraulic flush valve actuator 650 is hydraulically actuated by the piston pump 400. More specifically, part of the water supplied from the outer chamber 424 of the piston pump 400 is supplied to the hydraulic flush valve actuator 650 to actuate the hydraulic flush valve actuator 650. It is contemplated that alternatively, or additionally, part of the water supplied from the outer chamber 422 of the piston pump 400 could be supplied to the hydraulic flush valve actuator 650 to actuate the hydraulic flush valve actuator 650. With reference to FIG. 30, in one embodiment, the hydraulic flush valve actuator 650 includes a turbine 652 driven by the water supplied form the outer chamber 424. The turbine 652 drives a gear 654 which in turn drives the shaft 634 of the flush valve 610. The shaft 634 turns the valve member 632 of the flush valve 610 to open and close the flush valve 610 as described above with respect to FIG. 27. Other types of hydraulic flush valve actuators are contemplated.

It is contemplated that the flush valve 610 could be opened and closed by other types of flush valve actuators. For example, the flush valve 610 could be opened and closed by an electric actuator controlled by a timer. In another example, the flush valve 610 could be opened and closed by an electric actuator controlled by a control unit that receives signals from one or more sensors sensing one or more operating conditions of the RO cell 240, where the control unit opens or closes the flush valve based on the signals received from the one or more sensors.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A wave energy converter (WEC) subsystem comprising:
   a float;
   an anchor disposed below the float;
   a hydraulic cylinder connected to the float, the hydraulic cylinder comprising:
   a cylinder body defining a cylinder axis,
   a piston slidably received in the cylinder body, and a rod connected to the piston and having a portion extending outside of the cylinder body, the rod and the piston being movable together along the cylinder axis between a retracted position and an extended position; and a line management system comprising:

a rod pulley connected to the portion of the rod extending outside of the cylinder body and being movable along the cylinder axis together with the piston and the rod, a swivel bracket connected to the float, a bottom pulley rotatably supported by the swivel bracket about a rotation axis, the swivel bracket pivotably connecting the bottom pulley to the float about a pivot axis such that the bottom pulley is pivotable relative to the float about the pivot axis, the pivot axis being orthogonal to the rotation axis, and a line connected between the float and the anchor, the line engaging the rod pulley and the bottom pulley, during a first stroke of the WEC subsystem:
float is moving upward, and
the piston and the rod are moving towards the retracted position; and during a second stroke of the WEC subsystem:
the float is moving downward, and
the piston and the rod are moving toward the extended position.

2. The WEC subsystem of claim 1, wherein the hydraulic cylinder is disposed generally horizontally.

3. The WEC subsystem of claim 1, wherein the bottom pulley is disposed below the hydraulic cylinder.

4. The WEC subsystem of claim 1, wherein the line engages the bottom pulley such that a vertical segment of the line is laterally and longitudinally aligned with a center of floatation of the float.

5. The WEC subsystem of claim 1, wherein the float includes at least two hulls each having a top surface, and the hydraulic cylinder is disposed between the at least two hulls and entirely below top surfaces of the at least two hulls.

6. A wave-actuated system for desalination of water by reverse osmosis (RO), comprising:

the WEC subsystem of claim 1; and a RO cell hydraulically connected to the hydraulic cylinder, the hydraulic cylinder supplying salt water to the RO cell.

7. The WEC subsystem of claim 1, wherein:

the swivel bracket and the bottom pulley are part of a pulley assembly; and the pulley assembly includes at least one tube;

the line passing through the at least one tube for maintaining the line engaged with the bottom pulley.

8. The WEC subsystem of claim 1, wherein the line management system further comprises a winch connected to the float, the winch being lockable to maintain a predetermined length in the line.

9. The WEC subsystem of claim 8, wherein the line management system further comprises a redirection pulley, and the line is engaged in the redirection pulley.

10. The WEC subsystem of claim 9, further comprising:

a power source connected to the float and being operatively connected to the winch, and a communication device operatively connected to the power source and the winch for remotely operating the winch.

11. A wave energy converter (WEC) subsystem comprising:

a float;

an anchor disposed below the float;

a hydraulic cylinder connected to the float, the hydraulic cylinder comprising:

a cylinder body defining a cylinder axis, a piston slidably received in the cylinder body, and a rod connected to the piston and having a portion extending outside of the cylinder body, the rod and the piston being movable together along the cylinder axis between a retracted position and an extended position; and a line management system comprising:

a rod pulley connected to the portion of the rod extending outside of the cylinder body and being movable along the cylinder axis together with the piston and the rod, a bottom pulley connected to the float, a line connected between the float and the anchor, the line engaging the rod pulley and the bottom pulley, a redirection pulley, the line being engaged in the redirection pulley, a winch connected to the float, the winch being lockable to maintain a predetermined length in the line, during a first stroke of the WEC subsystem:
float is moving upward, and
the piston and the rod are moving towards the retracted position; and during a second stroke of the WEC subsystem:
the float is moving downward, and
the piston and the rod are moving toward the extended position;

the line defining:

a first segment extending between the winch and the redirection pulley;

a second segment extending between the redirection pulley and the rod pulley;

a third segment extending between the rod pulley and the bottom pulley, the third segment being disposed below the second segment; and a fourth segment extending between the bottom pulley and the anchor;

a first pitch angle being defined between the second segment and the cylinder axis when the rod is in the retracted position, and a second pitch angle being defined between the second segment and the cylinder axis when the rod is in the extended position, the first pitch angle being greater than the second pitch angle.

12. The WEC subsystem of claim 1, wherein the line is one of a rope, a cable, a strap, a belt, and a tether.

13. The WEC subsystem of claim 1, wherein the line includes a device for maintaining tension in the line, the device including at least one of:

at least one of a spring and an elastic cord connected in parallel to the line, and a mass connected to the line.

14. The WEC subsystem of claim 5, wherein the at least two hulls are fillable using expanding foam.

15. The wave-actuated system of claim 6, wherein:

the piston defines first and second variable volume chambers within the cylinder body; and the RO cell is hydraulically connected to the first and second variable volume chambers for receiving salt water from the first and second variable volume chambers.

* * * * *